US012180003B2

(12) United States Patent
Austrheim

(10) Patent No.: US 12,180,003 B2
(45) Date of Patent: Dec. 31, 2024

(54) CONTAINER-HANDLING VEHICLE

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

(21) Appl. No.: 17/047,400

(22) PCT Filed: Feb. 7, 2019

(86) PCT No.: PCT/EP2019/052998
§ 371 (c)(1),
(2) Date: Oct. 14, 2020

(87) PCT Pub. No.: WO2019/206482
PCT Pub. Date: Oct. 31, 2019

(65) Prior Publication Data
US 2021/0139239 A1    May 13, 2021

(30) Foreign Application Priority Data
Apr. 25, 2018  (NO) .................................. 20180588

(51) Int. Cl.
*B65G 1/04* (2006.01)
*B66C 13/08* (2006.01)

(52) U.S. Cl.
CPC ......... *B65G 1/0464* (2013.01); *B65G 1/0492* (2013.01); *B65G 2201/0258* (2013.01); *B66C 13/08* (2013.01)

(58) Field of Classification Search
CPC .............. B65G 1/0464; B65G 1/0492; B65G 2201/0258; B65G 1/065; B65G 1/0485; B65G 1/06; B66C 13/08
See application file for complete search history.

(56) References Cited

U.S. PATENT DOCUMENTS 3,789,998 A * 2/1974 Fathauer ................. B66C 1/101
294/81.4
2017/0152111 A1  6/2017 Kinugawa et al.
(Continued)

FOREIGN PATENT DOCUMENTS

| AU | 2017347684 A1 | 5/2019 |
| CN | 101818580 A | 9/2010 |

(Continued)

OTHER PUBLICATIONS

English Translation of Office Action issued in Japanese Application No. 2020-558922 dated Mar. 3, 2023 (7 pages).
(Continued)

*Primary Examiner* — Lynn E Schwenning
*Assistant Examiner* — Lucia Elba Rodriguez
(74) *Attorney, Agent, or Firm* — Baker Botts L.L.P.

(57) ABSTRACT

The present invention provides a container-handling vehicle (9') for picking up storage containers (6) from a three-dimensional grid (4) of an underlying storage system (1), comprising a vehicle body (13) and at least one lifting device (18) for lifting a storage container (6) from the grid (4), the lifting device (18') comprises a lifting band drive assembly (47, 47',31), a horizontal lifting frame (17) and a plurality of lifting bands (16a, 16b); the lifting band drive assembly (47, 47',31) is connected to the vehicle body (13) and comprises at least one rotatable lifting shaft (22.22'); the lifting frame (17,17) comprises four corner sections (36), gripper elements (24) for releasable connection to a storage container (6), and a lifting band connector (32,32') arranged at each of the corner sections; the lifting bands (16a, 16b) are connected to the lifting band drive assembly (47, 47',31) and the lifting band connectors (32,32'), such that the lifting frame (17, 17) may move in a vertical direction relative to the lifting band drive assembly by rotation of the lifting shaft (Continued)

(22,22); wherein at least three of the lifting band connectors (32,32') are adjustable, such that the vertical distance between the respective corner sections and the lifting band drive assembly may be adjusted.

18 Claims, 26 Drawing Sheets

(56) References Cited

U.S. PATENT DOCUMENTS

| | | | | |
|---|---|---|---|---|
| 2019/0225436 | A1* | 7/2019 | Lindbo | B65G 1/0464 |
| 2019/0229003 | A1* | 7/2019 | Kesil | H01L 21/67712 |

FOREIGN PATENT DOCUMENTS

| | | |
|---|---|---|
| CN | 102460675 A | 5/2012 |
| CN | 202967859 U | 6/2013 |
| CN | 103231994 A | 8/2013 |
| CN | 206634646 U | 11/2017 |
| EP | 2743227 | 12/2014 |
| JP | H08138756 A | 5/1996 |
| JP | H9-110114 A | 4/1997 |
| JP | 10-81487 | 3/1998 |
| JP | 11-106181 | 4/1999 |
| JP | 2000281278 A | 10/2000 |
| JP | 2006103879 A | 4/2006 |
| JP | 2017-95261 A | 6/2017 |
| NO | 317366 B1 | 10/2004 |
| NO | 2018/060527 A1 | 4/2018 |
| WO | 2014090684 A1 | 6/2014 |
| WO | 2015193278 A1 | 12/2015 |
| WO | 2017/129384 | 8/2017 |
| WO | 2017129384 A1 | 8/2017 |
| WO | 2018073392 A1 | 4/2018 |

OTHER PUBLICATIONS

Wikipedia contributors; "Brushless DC electric motor"; Wikipedia, The Free Encyclopedia, May 20, 2023; Retrieved from the Internet: URL: https://en.wikipedia.org/wiki/Brushless_DC_electric_motor (9 pages).
Office Action issued in Chinese Application No. 201880092701.9; Dated Jul. 14, 2021 (14 pages).
English Translation of Office Action issued in Chinese Application No. 2019800277848; Dated Aug. 3, 2021 (11 pages).
Office Action issued in Japanese Patent Application No. 2020-558922, mailed on Feb. 28, 2024 (7 pages).
Norwegian Search Report of Nov. 24, 2018, cited inter alia as statement of relevance for JP references cited therein, with relevance to specific claims noted in the search report.
Lui Jing, Office Action for Chinese Patent Application No. CN2024042400013370, dated Apr. 24, 2024, 12 pages , pub. SIPO, Beijing, China.
Hoffert, Rudi, Extended European Search Report for European patent application No. EP24180948.2, dated Sep. 9, 2024, 6 pages, published by the European Patent Office, Munich, Germany.
Hoffert, Rudi, International Search Report and Written Opinion, Application No. PCT/EP2019/052998, mailed May 27, 2019, 15 pages, published by the European Patent Office, Rijswijk, Netherlands.

\* cited by examiner

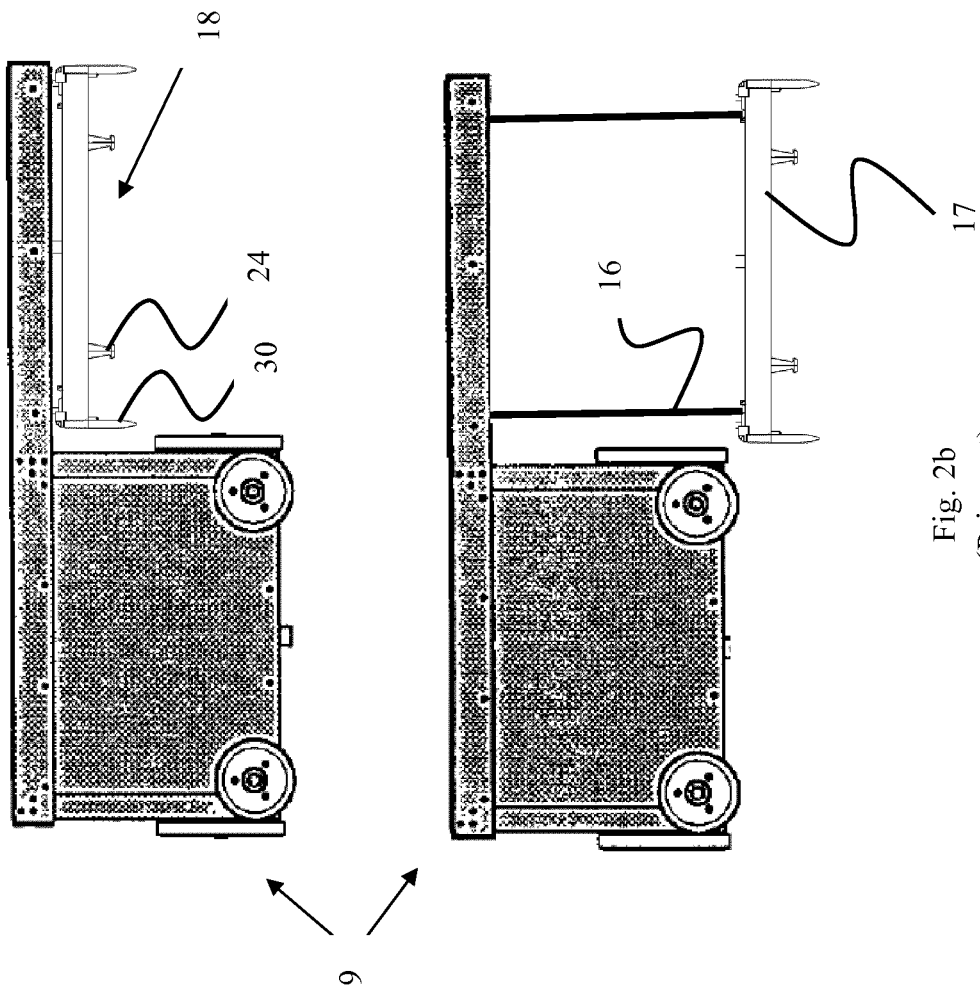
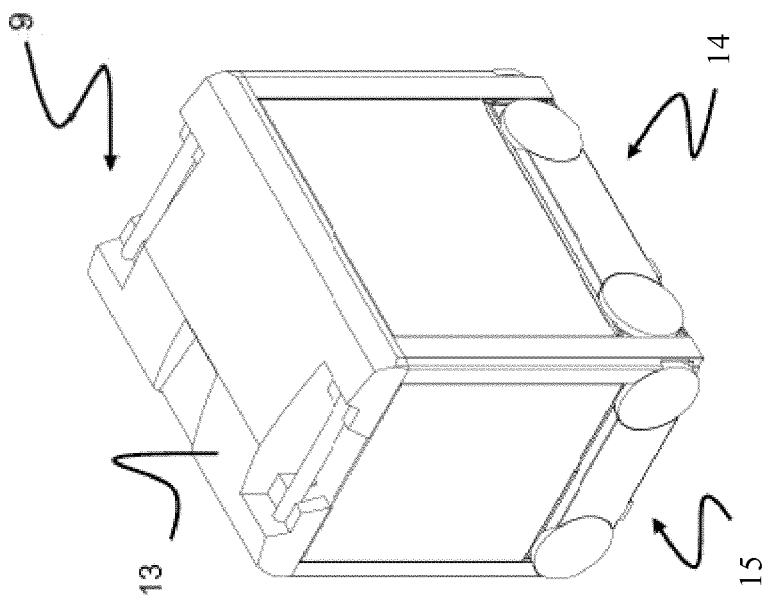
Fig. 2a
(Prior art)
Fig. 2b
(Prior art)

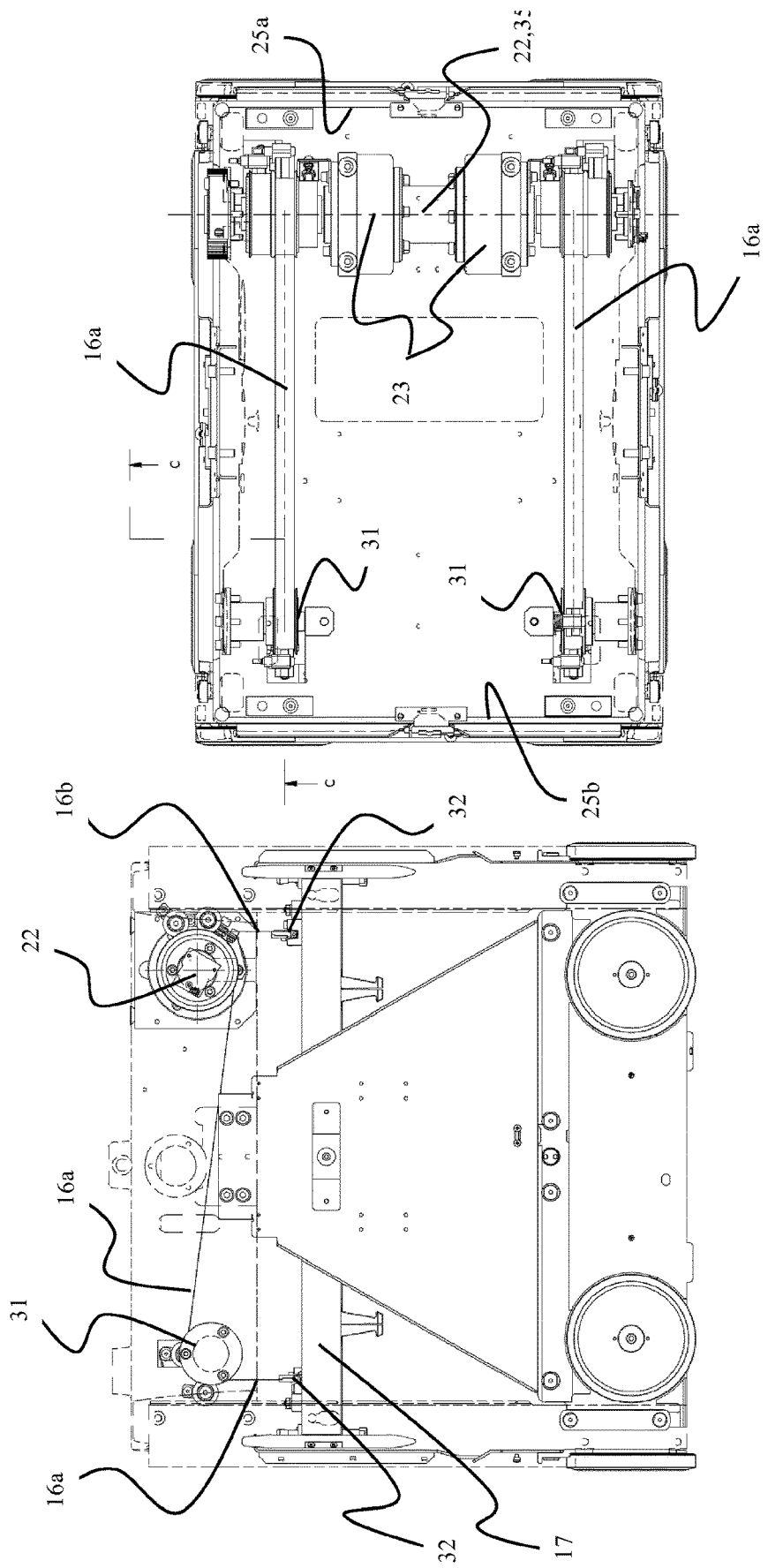

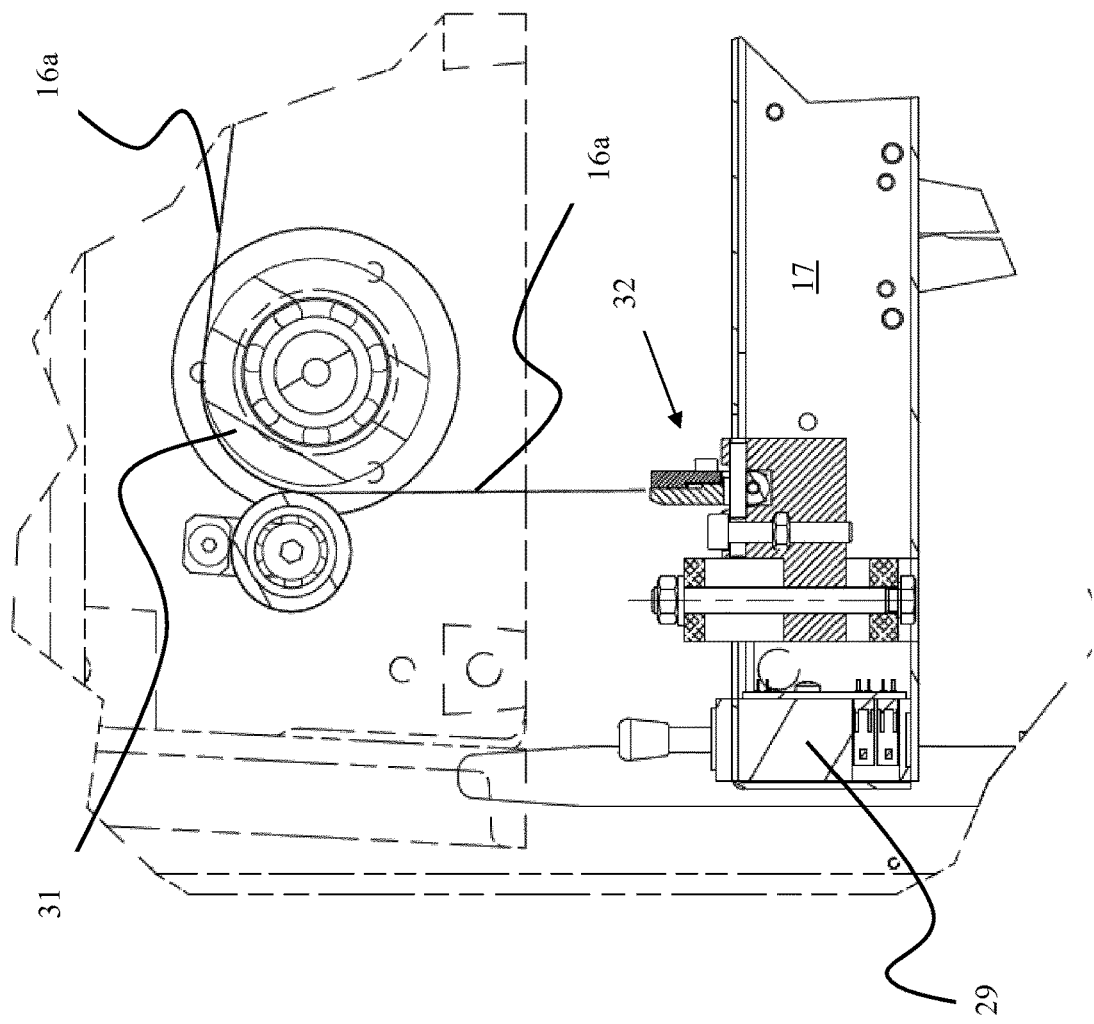
Fig. 7b (Detail B)
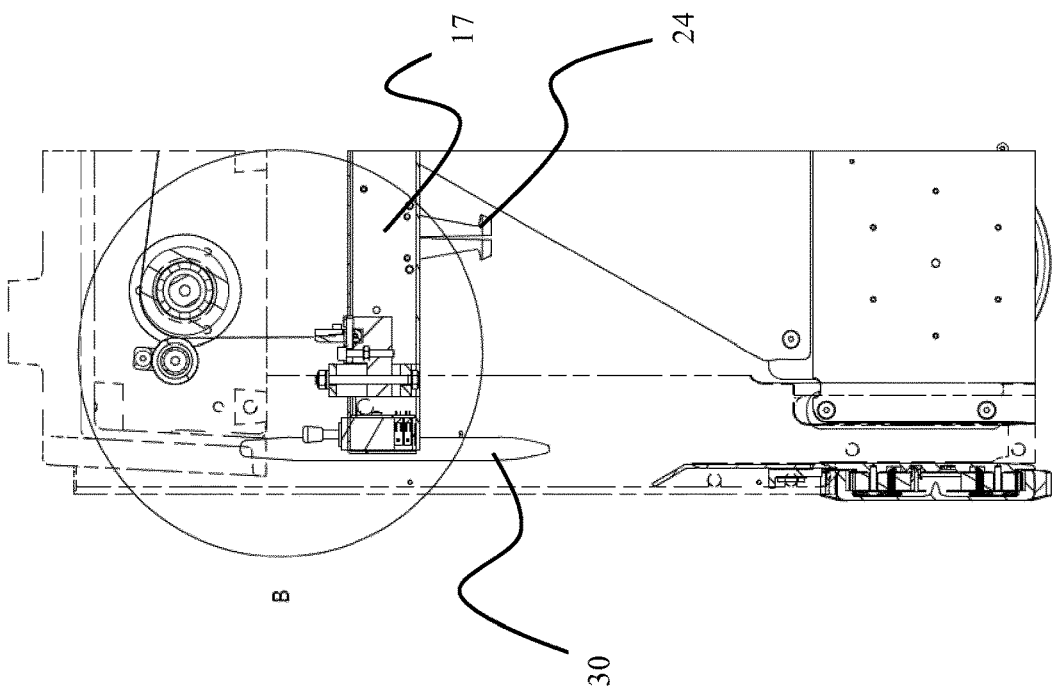
Fig. 7a (Section C-C)

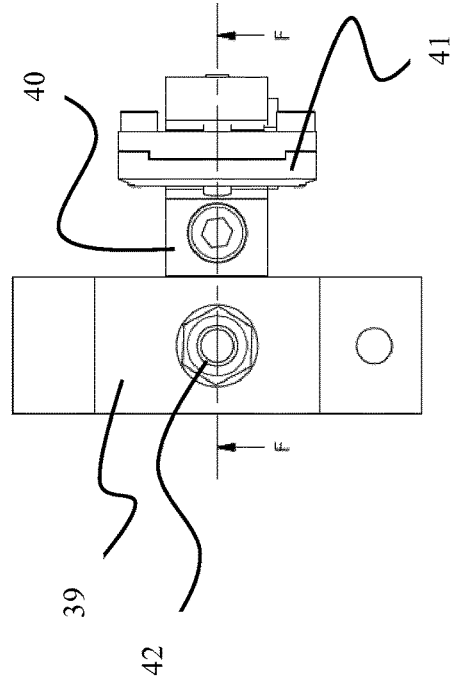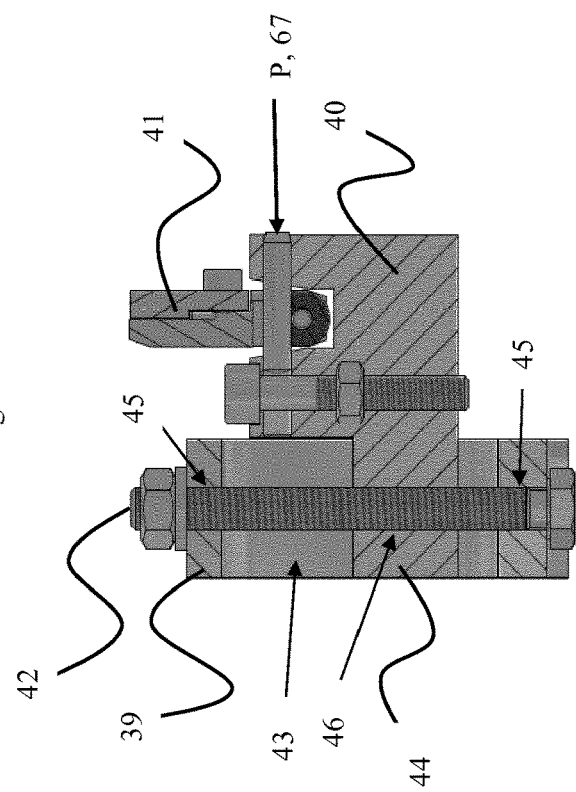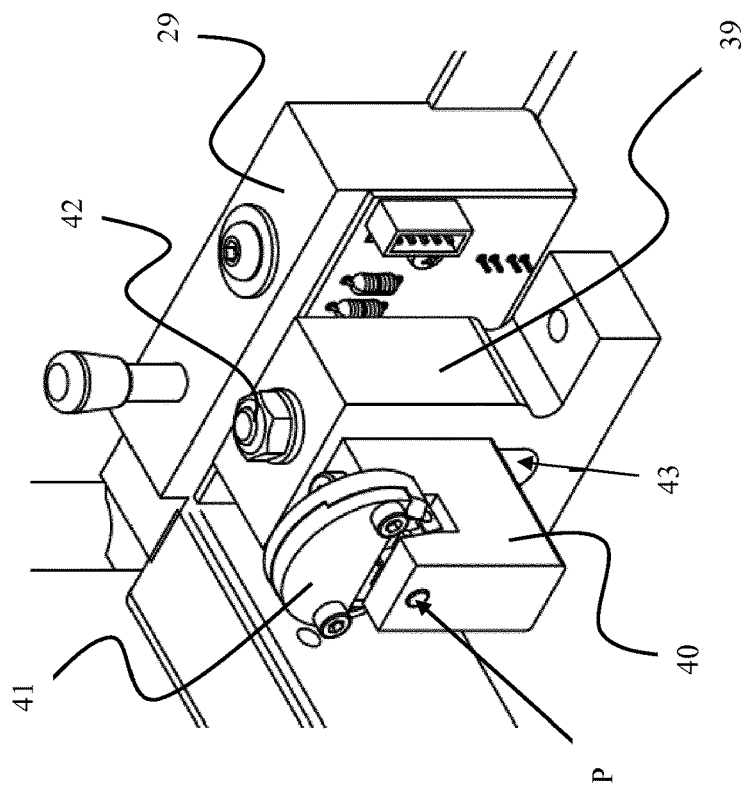

Fig. 13 (Section A-A)

Fig. 15 (Section A-A)

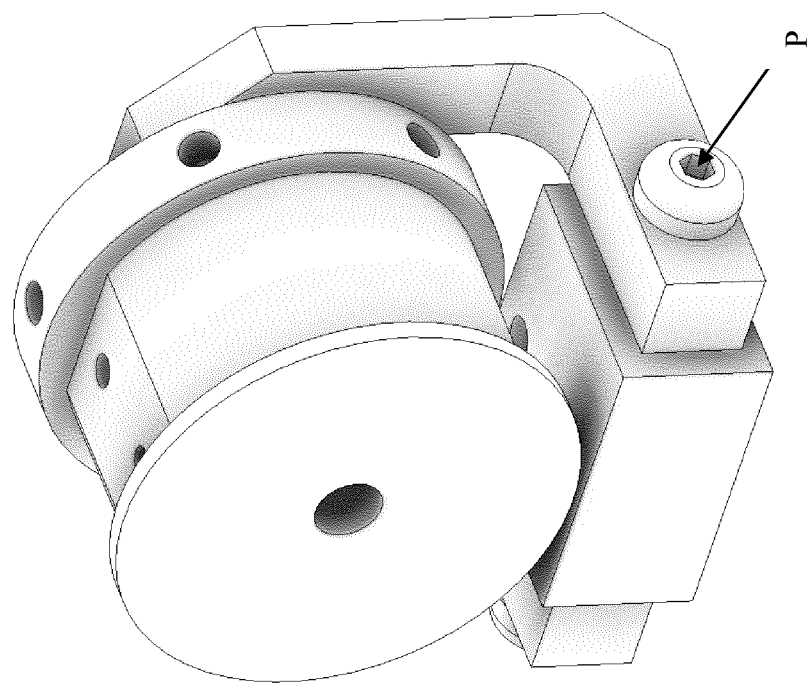
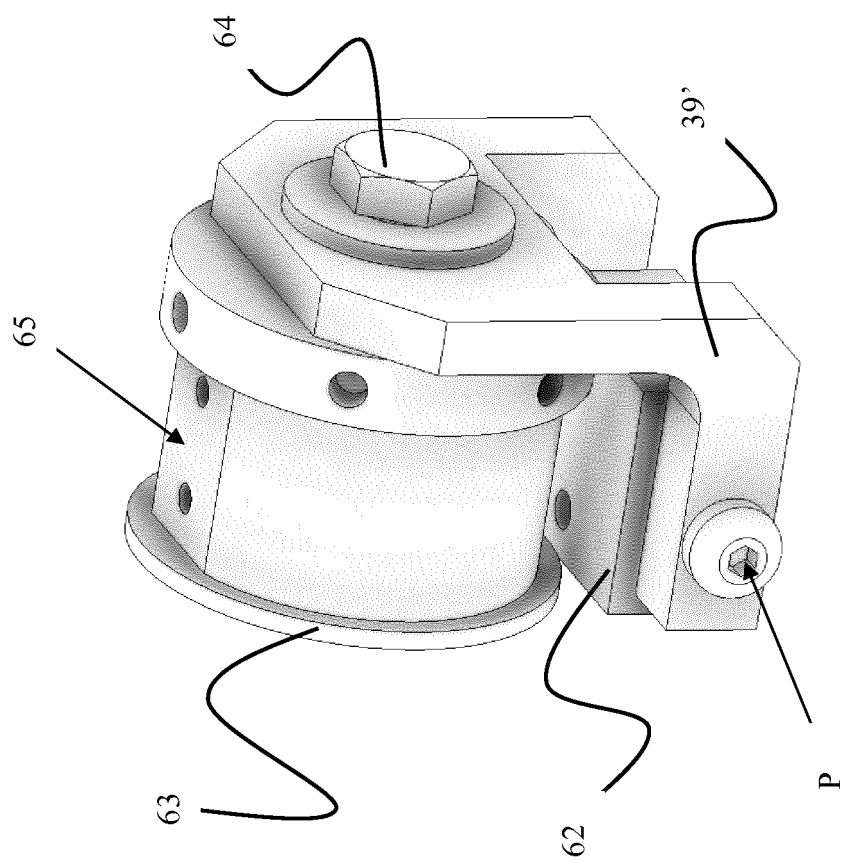
Fig. 22

Fig. 25 (Section A-A)

Fig. 26 (Section B-B)

CONTAINER-HANDLING VEHICLE

TECHNICAL FIELD

The present invention relates to a container handling vehicle and an automated storage and retrieval system comprising the container handling vehicle.

BACKGROUND AND PRIOR ART

Storage systems comprising a three-dimensional storage grid structure, within which storage containers/bins are stacked on top of each other, are well known.

FIG. 1 discloses a framework structure of a typical prior art automated storage and retrieval system 1 and FIGS. 2a and 2b disclose known container-handling vehicles of such a system. The storage system is disclosed in detail in for instance NO317366 and WO 2014/090684 A1.

The framework structure comprises a plurality of upright members/profiles 2 and a plurality of horizontal members 3, which are supported by the upright members 2. The members 2, 3 may typically be made of metal, e.g. extruded aluminium profiles.

The framework structure defines a storage grid 4 comprising multiple grid columns 12 arranged in rows. A majority of the grid columns 12 are storage columns 5 in which storage containers 6, also known as containers, are stacked one on top of another to form stacks 7. Each storage container 6 (or container for short) may typically hold a plurality of product items (not shown), and the product items within a storage container 6 may be identical or may be of different product types depending on the application. The framework structure guards against horizontal movement of the stacks 7 of storage containers 6, and guides vertical movement of the containers 6, but does normally not otherwise support the storage containers 6 when stacked.

The upper horizontal members 3 comprise a rail system 8 arranged in a grid pattern across the top of the grid columns 12, on which rail system 8 a plurality of container-handling vehicles 9 are operated to raise storage containers 6 from and lower storage containers 6 into the storage columns 5, and also to transport the storage containers 6 above the storage columns 5. The rail system 8 comprises a first set of parallel rails 10 arranged to guide movement of the container-handling vehicles 9 in a first direction X across the top of the frame structure 1, and a second set of parallel rails 11 arranged perpendicular to the first set of rails 10 to guide movement of the container-handling vehicles 9 in a second direction Y, which is perpendicular to the first direction X, see FIG. 3. In this way, the rail system 8 defines an upper end of the storage columns 5, above which the container-handling vehicles 9 can move laterally above the storage columns 5, i.e. in a plane, which is parallel to the horizontal X-Y plane.

Each container-handling vehicle 9 comprises a vehicle body 13 and first and second sets of wheels 14, 15 which enable the lateral movement of the container-handling vehicle 9, i.e. the movement in the X and Y directions. In FIG. 2, two wheels in each set are visible. The first set of wheels 14 is arranged to engage with two adjacent rails of the first set 10 of rails, and the second set of wheels 15 arranged to engage with two adjacent rails of the second set 11 of rails. One of the set of wheels 14, 15 can be lifted and lowered, so that the first set of wheels 14 and/or the second set of wheels 15 can be engaged with their respective set of rails 10, 11 at any one time.

Each container-handling vehicle 9 also comprises a lifting device 18 (not shown in FIGS. 1 and 2a, but visible in FIG. 2b) for vertical transportation of storage containers 6, e.g. raising a storage container 6 from and lowering a storage container 6 into a storage column 5. The lifting device 18 comprises a lifting frame (not shown in FIG. 2a, but similar to the one shown in FIG. 2b labelled 17) which is adapted to engage a storage container 6, which lifting frame can be lowered from the vehicle body 12 so that the position of the lifting frame with respect to the vehicle body 12 can be adjusted in a third direction Z, which is orthogonal the first direction X and the second direction Y.

Conventionally, and for the purpose of this application, Z=1 identifies the uppermost layer of the grid 4, i.e. the layer immediately below the rail system 8 (in the present application, the rail system 8 is termed the top level of the grid), Z=2 is the second layer below the rail system 8, Z=3 is the third layer etc. In the embodiment disclosed in FIG. 1, Z=8 identifies the lowermost, bottom layer of the grid 4. Consequently, as an example and using the Cartesian coordinate system X, Y, Z indicated in FIG. 1, the storage container identified as 6' in FIG. 1 can be said to occupy grid location or cell X=10, Y=2, Z=3. The container-handling vehicles 9 can be said to travel in layer Z=0 and each grid column 12 can be identified by its X and Y coordinates.

Each container-handling vehicle 9 comprises a storage compartment or space for receiving and stowing a storage container 6 when transporting the storage container 6 across the grid 4. The storage space may comprise a cavity 21 arranged centrally within the vehicle body 13, e.g. as is described in WO2014/090684A1, the contents of which are incorporated herein by reference.

Alternatively, the container-handling vehicles may have a cantilever construction, as is described in NO317366, the contents of which are also incorporated herein by reference.

The container-handling vehicles 9 may have a footprint F, i.e. a horizontal periphery in the X and Y directions (see FIG. 4), which is generally equal to the lateral or horizontal extent of a grid column 12, i.e. the periphery/circumference of a grid column 12 in the X and Y directions, e.g. as described in WO2015/193278A1, the contents of which are incorporated herein by reference. Alternatively, the container-handling vehicles 9 may have a footprint which is larger than the lateral extent of a grid column 12, e.g. a footprint approximately twice the lateral extent as disclosed in WO2014/090684A1.

The rail system 8 may be a single-track system, as shown in FIG. 3. Preferably, the rail system 8 is a double-track system, as shown in FIG. 4, thus allowing a container-handling vehicle 9 having a footprint F generally corresponding to the lateral extent of a grid column 12 to travel along a row of grid columns in either an X or Y direction even if another container-handling vehicle 9 is positioned above a grid column 12 adjacent to that row.

In a storage grid, a majority of the grid columns 12 are storage columns 5, i.e. grid columns where storage containers are stored in stacks. However, a grid normally has at least one grid column 12 which is used not for storing storage containers, but which comprises a location where the container-handling vehicles can drop off and/or pick up storage containers so that they can be transported to an access station where the storage containers 6 can be accessed from outside of the grid or transferred out of or into the grid, i.e. a container handling station. Within the art, such a location is normally referred to as a "port" and the grid column in which the port is located may be referred to as a port column.

The grid 4 in FIG. 1 comprises two port columns 19 and 20. The first port column 19 may for example be a dedicated drop-off port column where the container-handling vehicles 9 can drop off storage containers to be transported to an access or a transfer station (not shown), and the second port 20 column may be a dedicated pick-up port column where the container-handling vehicles 9 can pick up storage containers that have been transported to the grid 4 from an access or a transfer station.

For monitoring and controlling the automated storage and retrieval system, e.g. monitoring and controlling the location of respective storage containers within the grid 4, the content of each storage container 6 and the movement of the container-handling vehicles 9 so that a desired storage container can be delivered to the desired location at the desired time without the container-handling vehicles 9 colliding with each other, the automated storage and retrieval system comprises a control system, which typically is computerised and comprises a database for keeping track of the storage containers.

When a storage container 6 stored in the grid 4 disclosed in FIG. 1 is to be accessed, one of the container-handling vehicles 9 is instructed to retrieve the target storage container from its position in the grid 4 and transport it to the drop-off port 19. This operation involves moving the container-handling vehicle 9 to a grid location above the storage column 5 in which the target storage container is positioned, retrieving the storage container 6 from the storage column 5 using the container-handling vehicle's lifting device (not shown, being internally arranged in a central cavity of the vehicle, but similar to the lifting device 18 of the second prior art vehicle of FIG. 2b), and transporting the storage container to the drop-off port 19. A second prior art vehicle 9 is shown in FIG. 2b to better illustrate the general design of the lifting device. Details of the second vehicle 9 are described in the Norwegian patent NO317366. The lifting devices 18 of both prior art vehicles 9 comprise a set of lifting bands 16 extending in a vertical direction and connected close to the corners of a lifting frame 17 (may also be termed a gripping device) for releasable connection to a storage container. The lifting frame 17 features container connecting elements 24 for releasably connecting to a storage container, and guiding pins 30.

To raise or lower the lifting frame 17 (and optionally a connected storage container 6), the lifting bands 16 are connected to a band drive assembly. In the band drive assembly, the lifting bands 16 are commonly spooled on/off at least two rotating lifting shafts or reels (not shown) arranged in the container-handling vehicle, wherein the lifting shafts are further connected via belts/chains to at least one common rotor shaft providing synchronized rotational movement to the at least two lifting shafts. Various designs of the lifting shafts are described in for instance WO2015/193278 A1 and WO2017/129384.

Most prior art container-handling vehicles having a central cavity for receiving a storage bin, as in FIG. 2a, features a lifting device 18 having a band drive assembly comprising at least one rotor shaft, centrally arranged in an upper section of the vehicle and connected to a lifting motor. In addition to the centrally arranged rotor shaft, such lifting devices comprise an assembly of secondary shafts and/or sheaves onto which the lifting bands are spooled on and off. The secondary shafts and/or sheaves are rotated by being connected to the centrally arranged rotor shaft via belts/chains and are arranged at the corners of the central cavity to provide the required positioning of the lifting bands 16 relative the lifting frame 17. Having such an assembly of multiple movable parts is not an optimal solution since the lifting devices are relatively service intensive and occupies a large volume inside the robot.

A container-handling vehicle featuring a centrally arranged rotatable lifting shaft, onto which the lifting bands are spooled, is disclosed in WO2017/129384 A1.

To obtain a correct length of all the lifting bands 16 relative the lifting frame, i.e. such that the lifting frame 17 is kept horizontal during operation, the length of the lifting bands must be adjusted both initially, as well as at various service intervals, since they tend to elongate slightly during use. In the prior art lifting devices, the lifting bands are commonly connected and spooled onto separate reels arranged at an upper level within the container-handling vehicle 9. To adjust a lifting band, the corresponding reel may be disconnected from a rotational shaft and the lifting band adjusted by free rotation of the reel relative the rotational shaft. The reel is subsequently fastened to the rotational shaft when the lifting band has the desired length. To obtain access to the separate reels, a service person is commonly required to remove at least some of the bodywork covering the vehicle body 13 or enter the cramped interior of the vehicle.

In view of the above, it is desirable to provide a container-handling vehicle, and an automated storage and retrieval system comprising said container-handling vehicle, wherein the disadvantages of the prior art lifting devices are avoided or at least mitigated.

SUMMARY OF THE INVENTION

The present invention is defined by the attached claims and in the following:

In a first aspect, the present invention provides a container-handling vehicle for picking up storage containers from a three-dimensional grid of an underlying storage system, comprising a vehicle body and at least one lifting device for lifting/lowering a storage container from/to the grid, the lifting device comprises a lifting band drive assembly, a horizontal lifting frame and a plurality of lifting bands;

the lifting band drive assembly is connected to the vehicle body and comprises at least one rotatable lifting shaft;

the lifting frame comprises four corner sections, gripper elements for releasable connection to a storage container, and a lifting band connector arranged at each of the corner sections;

the lifting bands are connected to the lifting band drive assembly and the lifting band connectors, such that the lifting frame may move in a vertical direction relative the lifting band drive assembly by rotation of the lifting shaft;

wherein at least three of the lifting band connectors are adjustable, such that the vertical distance between the respective corner sections (i.e. the corner sections at which the adjustable lifting band connectors are arranged) and the lifting band drive assembly may be adjusted (alternatively, wherein at least three of the lifting band connectors are adjustable, such that the level of the respective corner sections may be adjusted).

By adjusting the vertical distance between at least three corner sections of the lifting frame and the lifting band drive assembly (or by adjusting the level of the at least three corner sections), any deviation of the lifting frame (i.e. any deviation of the plane in which the lifting frame is arranged) from the horizontal plane may be corrected.

The plurality of lifting bands is preferably four separate lifting bands, each lifting band extending between the lifting band drive assembly and the lifting frame. However, depending on the connection between the lifting bands and the lifting band assembly, the plurality of lifting bands may for instance be two lifting bands, each lifting band having a middle section connected to the lifting band assembly such that each lifting band has two lifting band ends connected to the lifting band connectors of the lifting frame.

Preferably, the lifting frame comprises a top side and a bottom side, the lifting band connectors are arranged at the top side and the gripper elements are arranged at the bottom side.

In an embodiment of the container-handling vehicle, each adjustable lifting band connector comprises a bracket and a band connector hub, the bracket is connected to the lifting frame and the band connector hub is connected to the bracket and one of the lifting bands, such that movement of the band connector hub relative to the bracket will adjust the vertical distance between the respective corner section and the lifting band drive assembly (i.e. adjusting the vertical position or level of the respective corner section). The latter may alternatively be defined as; such that movement of the band connector hub relative to the bracket will adjust the vertical distance between the lifting frame at its respective corner sections and the lifting band drive assembly.

Alternatively, the bracket may be defined as being arranged on an upwards facing side of the lifting frame.

In an embodiment of the container-handling vehicle, the vertical distance between the respective corner section and the lifting band drive assembly may be adjusted by rotation of the band connector hub about a horizontal axis or by movement of the band connector hub in a vertical or horizontal direction.

In an embodiment of the container-handling vehicle, the band connector hub comprises a lifting band clamp, and the band connector hub is movable between a first position, wherein the lifting band clamp is at a lowest level relative the bracket, and a second position, wherein the lifting band clamp is at an upper level relative the bracket. In other words, in the first position the lifting band clamp is at a higher level relative to the bracket than in the second position.

In an embodiment of the container-handling vehicle, the band connector hub abuts an adjustment bolt when in the second position.

In an embodiment of the container-handling vehicle, the upper level of the lifting band clamp may be adjusted by actuation of the adjustment bolt. In other words, the level of the lifting band clamp when in the second position may be adjusted by actuation of the adjustment bolt. The adjustment bolt may be actuated by rotation.

In an embodiment of the container-handling vehicle, the band connector hub is biased towards the first position by a resilient element. The resilient element may be any suitable element able to provide a biasing force to the band connector hub, such as a spring.

In an embodiment of the container-handling vehicle, the band connector hub comprises a lever connected to the lifting band clamp, the lever being pivotably connected to the bracket about a horizontal axis. In other words, the band connector hub comprises a lever featuring a lifting band clamp, the lever being pivotably connected to the bracket about a horizontal axis.

In an embodiment of the container-handling vehicle, the lever may pivot between the first position and the second position.

In an embodiment of the container-handling vehicle, the lever may pivot between a first position, wherein the lifting band clamp is at a lowest level relative the bracket, and a second position, wherein the lifting band clamp is at an upper level relative the bracket.

In an embodiment of the container-handling vehicle, the lever abuts an adjustment bolt when in the second position.

In an embodiment of the container-handling vehicle, the upper level of the lifting band clamp may be adjusted by actuation of the adjustment bolt. In other words, the lever abuts an adjustment bolt when in the second position, such that the upper level of the lifting band clamp may be adjusted by actuation of the adjustment bolt.

In an embodiment of the container-handling vehicle, the lever is biased towards the first position, preferably by a resilient element such as a spring.

In an embodiment of the container-handling vehicle, the band connector hub is connected to the bracket via an adjustment element, such that actuation of the adjustment element will allow movement of the band connector hub relative to the bracket.

In an embodiment of the container-handling vehicle the adjustment element is a threaded bolt, that may be actuated by rotation, or a locking device. The locking device may for instance be actuated by release of the locking device to allow movement of the band connector hub relative to the bracket. Tightening/fastening of the locking device prevents movement of the band connector hub relative to the bracket. The locking device may for instance be a clamp assembly interacting with a slidable connection between the band connector hub and the bracket.

In an embodiment of the container-handling vehicle, rotation of the threaded bolt moves the band connector hub relative to the bracket.

In an embodiment of the container-handling vehicle, the lifting frame comprises at least one control module for controlling the gripper elements, and at least a part of each lifting band connector is made in an electrical insulating material, such that the lifting bands are only in electrical contact with the lifting frame at or via the at least one control module.

The container-handling vehicle comprises a main control unit in electrical contact (i.e. in communication) with the at least one control module via the lifting bands In an embodiment of the container-handling vehicle, the lifting frame comprises four control modules, each control module in electrical contact with a separate/respective lifting band, i.e. in electrical contact with a separate/respective lifting band connector.

In an embodiment of the container-handling vehicle, the bracket, or an intermediate bracket element connecting the bracket and the lifting frame, is made in an electrical insulating material.

In an embodiment of the container-handling vehicle, each of the lifting band connectors comprises a pivotable connection having a centreline perpendicular to the vertical plane of the connected lifting band (i.e. the vertical plane in which the lifting band is arranged).

In an embodiment of the container-handling vehicle, the bracket comprises a vertical recess/cut-out and the band connector hub comprises an extension arranged in the recess, the recess comprises two vertically opposite smooth bores and the extension features a threaded bore in line with the smooth bores, wherein the threaded bolt is arranged in the smooth bores and the threaded bore such that rotation of the bolt will move the band connector hub in a vertical direction relative to the bracket.

In an embodiment of the container-handling vehicle, the band connector hub is a lifting band reel (onto which a lifting band may be spooled on and off) rotatably connected to the bracket via a threaded bolt, the bolt arranged such that the lifting band reel is allowed to rotate about a horizontal axis when the bolt is loosened and prevented from rotating when the bolt is tightened.

In an embodiment of the container-handling vehicle, the lifting band drive assembly comprises a lifting shaft assembly, the lifting shaft assembly comprises the lifting shaft and at least one brushless DC motor, the lifting shaft comprises a first end section and a second end section, and the brushless DC motor comprises a stator element and a rotor element, the rotor element is connected to, or forms a part of, the lifting shaft, and the lifting bands are connected at the first end section or the second end section, wherein the first end section is electrically insulated from the second end section, such that the lifting band(s) connected at the first end section may have an electric potential different from lifting bands connected at the second end section.

In an embodiment of the container-handling vehicle, a dual band reel is arranged at each of the first end section and the second end section, each dual band reel is connected to two separate lifting bands.

In an embodiment of the container-handling vehicle, each of the dual band reels provides electrical contact between at least one of the lifting bands connected thereto and a control unit arranged in the container-handling vehicle, such that electrical signals and/or power may be transferred from the control unit via the dual band reel to the at least one lifting band.

In an embodiment of the container-handling vehicle, each dual band reel comprises a slip ring for electrical signal transfer between a control unit arranged in the container-handling vehicle and the lifting bands via a conducting brush in contact with the slip ring.

At least an outer layer of the dual band reel and the slip ring is made in an electrically conducting material, such as an aluminium alloy. The dual band reel is preferably made as a single reel element comprising the slip ring. However, the dual band reel may also comprise two separate band reels and a slip ring provided the separate band reels and the slip ring are in electrical contact.

In an embodiment, the container-handling vehicle comprises wheels for moving the vehicle above or on top of the three-dimensional grid.

In an embodiment, the container-handling vehicle comprises a first set of wheels arranged at opposite sides of the vehicle body (or at opposite sides of a cavity of the vehicle body), for moving the vehicle along a first direction on the grid;
  a second set of wheels arranged at opposite sides of the vehicle body, for moving the vehicle along a second direction on the grid, the second direction being perpendicular to the first direction; and
  the first set of wheels displaceable in a vertical direction between a first position, wherein the first set of wheels allow movement of the vehicle along the first direction, and a second position, wherein the second set of wheels allow movement of the vehicle along the second direction.

In an embodiment of the container-handling vehicle, the vehicle body surrounds a cavity for accommodating at least one storage container and the lifting band drive assembly of the at least one lifting device is arranged at an upper level of the cavity. In an embodiment, the cavity is for accommodating at least two adjacent storage containers and two adjacent lifting devices. The cavity may be sized to accommodate multiple storage containers and lifting devices, for instance two, three or four storage containers.

In a second aspect, the invention provides a method of adjusting the position of a lifting frame of a container-handling vehicle, e.g. according to the first aspect, comprising the steps of:
  arranging the container-handling vehicle at a suitable location, for instance at an empty storage column at the periphery of the storage grid;
  lowering the lifting frame, such that a service person has access to the lifting band connectors; and
  adjusting at least one lifting band connector, such that the lifting frame is suspended in a horizontal plane by the lifting bands.

A suitable location is a location at which the lifting frame may be lowered a distance sufficient to provide easy access to the lifting band connectors.

In an embodiment of the method, the container-handling vehicle comprises a cavity in which the lifting device is arranged, and in the step of lowering the lifting frame, the lifting frame is lowered out of the cavity.

In an embodiment of the method, the at least one lifting band connector comprises a band connector hub and a bracket, and the step of adjusting the at least one lifting band connector comprises movement of the band connector hub relative to the bracket.

In an embodiment of the method, the step of adjusting the at least one lifting band connector adjusts the vertical distance between the respective corner sections and the lifting band drive assembly (i.e., adjusts the level of the lifting frame).

In an embodiment of the method, the step of lowering the lifting frame comprises lowering the lifting frame to a supporting structure on which the lifting frame is supported in a horizontal position, and the step of adjusting the at least one lifting band connector comprises tensioning any lifting bands that are slack.

In a third aspect, the present invention provides an automated storage and retrieval system comprising a three-dimensional grid and at least one container-handling vehicle according to the first aspect, wherein
  the grid comprises multiple storage columns, in which storage containers may be stored on top of one another in vertical stacks, and a port column for receiving and transporting a storage container to an access station; and
  the container handling vehicle is operated on rails at a top level of the grid for retrieving storage containers from, and storing storage containers in, the storage columns, and for transporting the storage containers horizontally across the grid.

In a fourth aspect, the present invention provides a method of adjusting the position of a lifting frame of a container-handling vehicle, comprising the steps of:
  lowering the lifting frame to a lowered position, such that a service person has access to the lifting frame; and
  adjusting the level of the lifting frame, such that the lifting frame is suspended in a horizontal plane.

In a fifth aspect, the present invention provides a method of adjusting the position of a lifting frame of a container-handling vehicle, the lifting frame comprises four corner sections and a lifting band connector arranged at each of the corner sections, each of the lifting band connectors are at least indirectly connected to a rotatable lifting shaft arranged in the container-handling vehicle by a lifting band (such that the lifting frame may be lowered and raised relative the lifting shaft or the remainder of the container-handling vehicle), at least three of the lifting band connectors are adjustable, such that the vertical distance between the respective corner sections and the rotatable lifting shaft may be adjusted (alternatively, such that the level of the respective corner sections may be adjusted), the method comprising the steps of:

arranging the container-handling vehicle at a suitable location, for instance at or above an empty storage column at a periphery of a storage grid;

lowering the lifting frame, such that a service person has access to the lifting band connectors; and adjusting at least one lifting band connector, such that the lifting frame is suspended in a horizontal plane by the lifting bands.

In further embodiments, the method according to the fifth aspect comprises any of the embodied features or steps of the method according to the second aspect.

In a sixth aspect, the present invention provides a container-handling vehicle comprising a lifting frame, wherein the lifting frame comprises four corner sections and a lifting band connector arranged at each of the corner sections, each of the lifting band connectors are at least indirectly connected to a rotatable lifting shaft arranged in the container-handling vehicle by a lifting band (such that the lifting frame may be lowered and raised relative the lifting shaft or the remainder of the container-handling vehicle), and at least three of the lifting band connectors are adjustable, such that the vertical distance between the respective corner sections and the rotatable lifting shaft may be adjusted (alternatively, such that the level of the respective corner sections may be adjusted).

In further embodiments, the container-handling vehicle according to the sixth aspect may comprise any of the embodied features of vehicle according to the first aspect.

In a seventh aspect, the present invention provides a lifting frame assembly comprising a lifting frame having four corner sections, gripper elements for releasable connection to a storage container, and a lifting band connector arranged at each of the corner sections, wherein each of the lifting band connectors is connectable to a lifting band and at least three of the lifting band connectors are adjustable. An adjustable lifting band connector is a connector able to adjust the vertical distance between the lifting frame and an element from which the lifting frame is suspended via a lifting band connected to the connector.

The adjustable lifting band connectors and the lifting frame of the seventh aspect may comprise any of the features described above in connection with the first aspect.

The term "lifting band drive assembly" is in the present invention intended to mean any assembly of at least one lifting shaft and any combination of reels, sheaves and/or motor(s) suitable for spooling and horizontal positioning of lifting bands, preferably four lifting bands, such that a lifting frame arranged below the lifting band assembly may be raised/lowered in the vertical direction while kept in a horizontal plane.

BRIEF DESCRIPTION OF THE DRAWINGS

Certain embodiments of the present invention will now be described in detail by way of example only and with reference to the following drawings:

FIGS. 2a and 2b depict two different prior art container handling vehicles.

FIG. 6a is a side view of the container-handling vehicle in FIG. 5.

FIG. 6b is a top view of the container-handling vehicle in FIG. 5.

FIG. 7a is a sectional side view of a portion of the container-handling vehicle in FIG. 5.

FIG. 7b is an enlarged view of details shown in FIG. 7a.

FIGS. 9a-9c are perspective, top and cross-sectional views of an adjustable band connector of the lifting frame in FIG. 8.

FIG. 22 show two perspective side views of an adjustable lifting band connector of the lifting frame in FIG. 21.

DETAILED DESCRIPTION OF THE INVENTION

Figure 1:
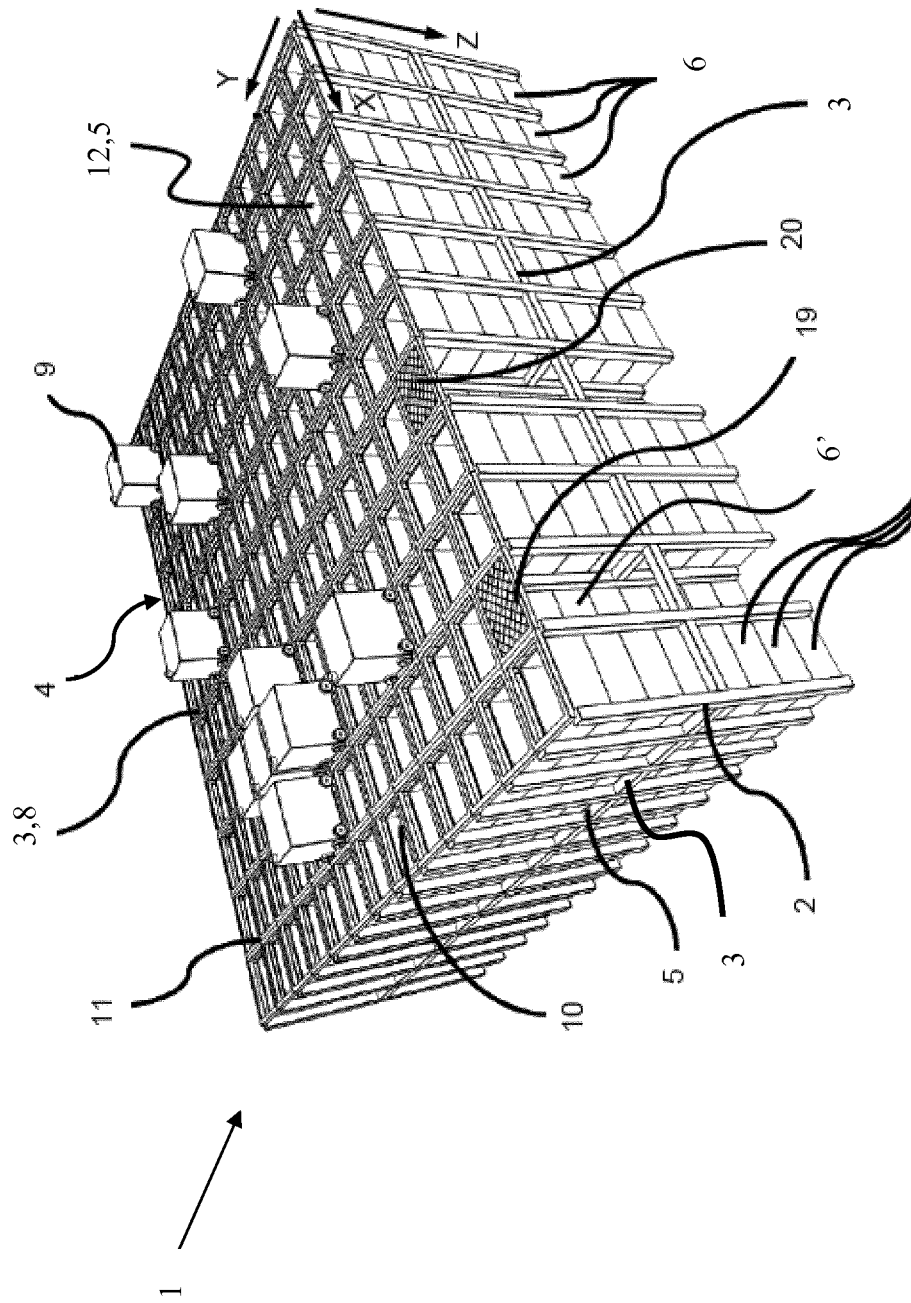
FIG. 1 is a perspective side view of a prior art storage and retrieval system.
Figure 4:
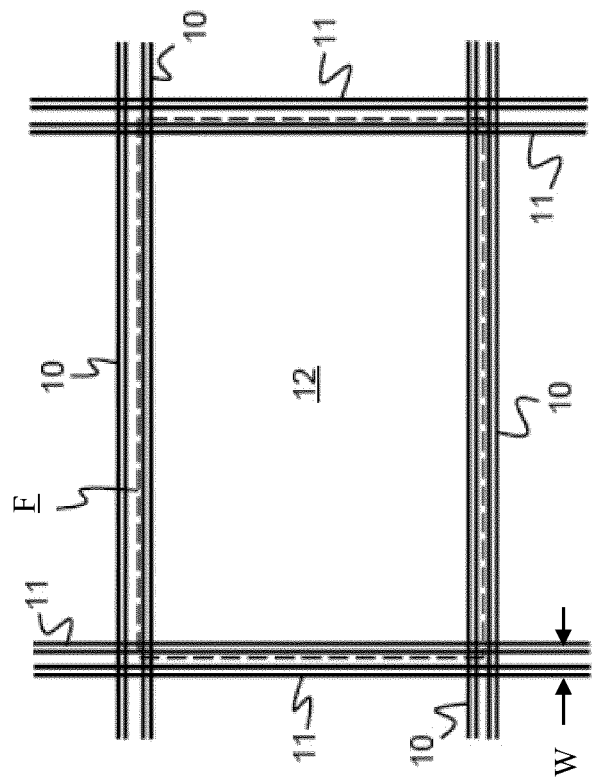
FIGS. 3 and 4 are top side schematic views of two types of rail systems for use in the storage system in FIG. 1.
Figure 3:
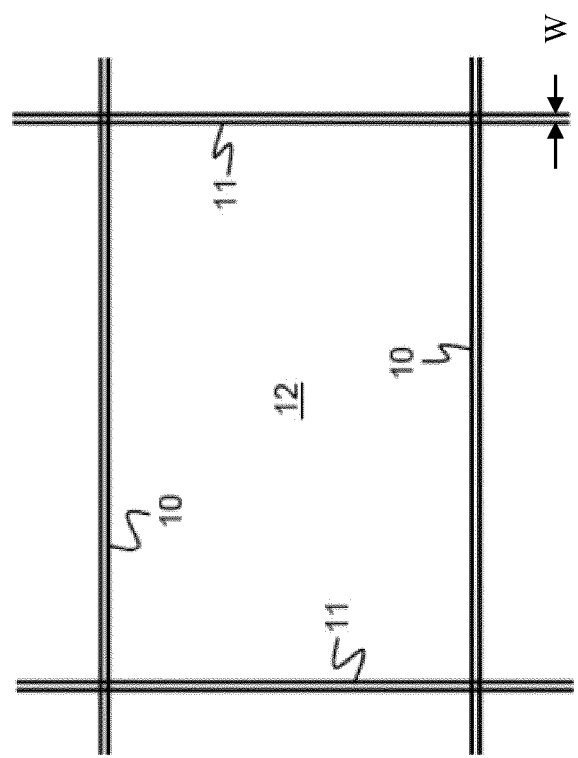

In the following, embodiments of the invention will be discussed in more detail by way of example only and with reference to the appended drawings. It should be understood, however, that the drawings are not intended to limit the invention to the subject-matter depicted in the drawings.

As mentioned above, a disadvantage of the prior art lifting devices 18 is the requirement of a lifting band drive assembly featuring a plurality of secondary shafts and/or sheaves, onto which the lifting bands 16 are spooled on and off, to provide the required positioning of the lifting bands relative the lifting frame. Further, to rotate the secondary shafts and/or sheaves they are connected to a rotor shaft via belts/chains.

Figure 5:
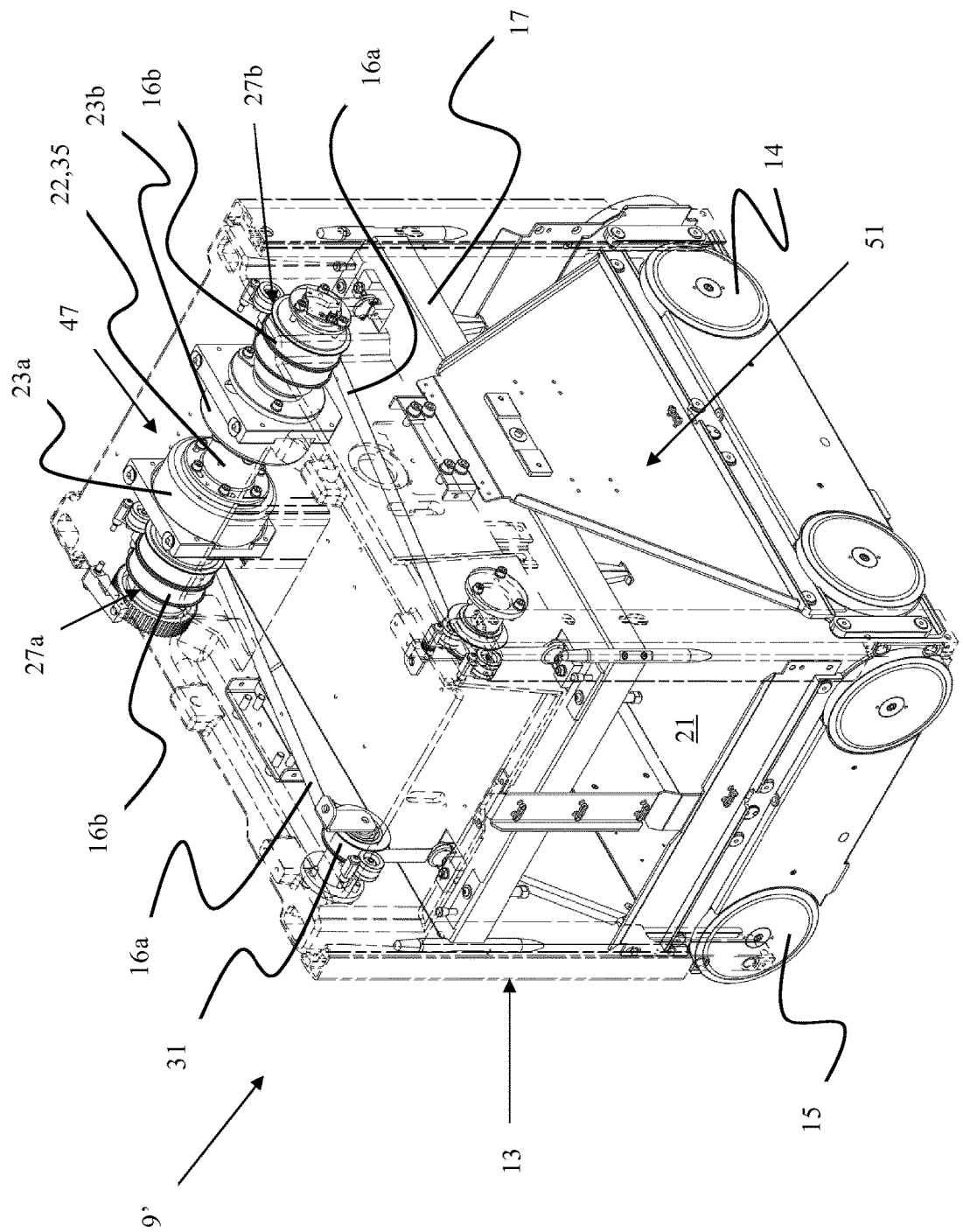
FIG. 5 is a perspective side view of an exemplary embodiment of a container-handling vehicle according to the invention.

An exemplary embodiment of a container-handling vehicle 9' according to the invention is shown in FIGS. 5, 6a and 6b. The main differential feature of the vehicle 9' in view of the prior art vehicles 9, is the inventive lifting device 18'.

As described for the prior art vehicles 9, the container-handling vehicle 9' is suitable for picking up storage containers 6 from a three-dimensional grid 4 of an underlying storage system 1, see FIG. 1. The vehicle 9' features a first set of wheels 14 arranged at opposite sides of the vehicle body 13, for moving the vehicle 9' along a first direction X on the grid 4, and a second set of wheels 15 arranged at opposite sides of the vehicle body 13, for moving the vehicle 9' along a second direction Y on the grid 4, the second direction Y being perpendicular to the first direction X. By use of a wheel displacement assembly 51, the first set of wheels may be displaced in a vertical direction Z between a first position, wherein the first set of wheels 14 allow movement of the vehicle 9' along the first direction X, and a second position, wherein the second set of wheels 15 allow movement of the vehicle 9' along the second direction Y.

The vehicle body 13 surrounds a cavity 21 sized to accommodate a storage container 6 suitable for a storage system as described above. A lifting device 18' is connected at a top section of the cavity 21. The lifting device is arranged to lift/lower a storage container 6 from/to the grid 4. When the storage container is accommodated within the cavity 21, the bottom of the storage container is at a level above the lowest level of the second set of wheels 15.

Figure 10:
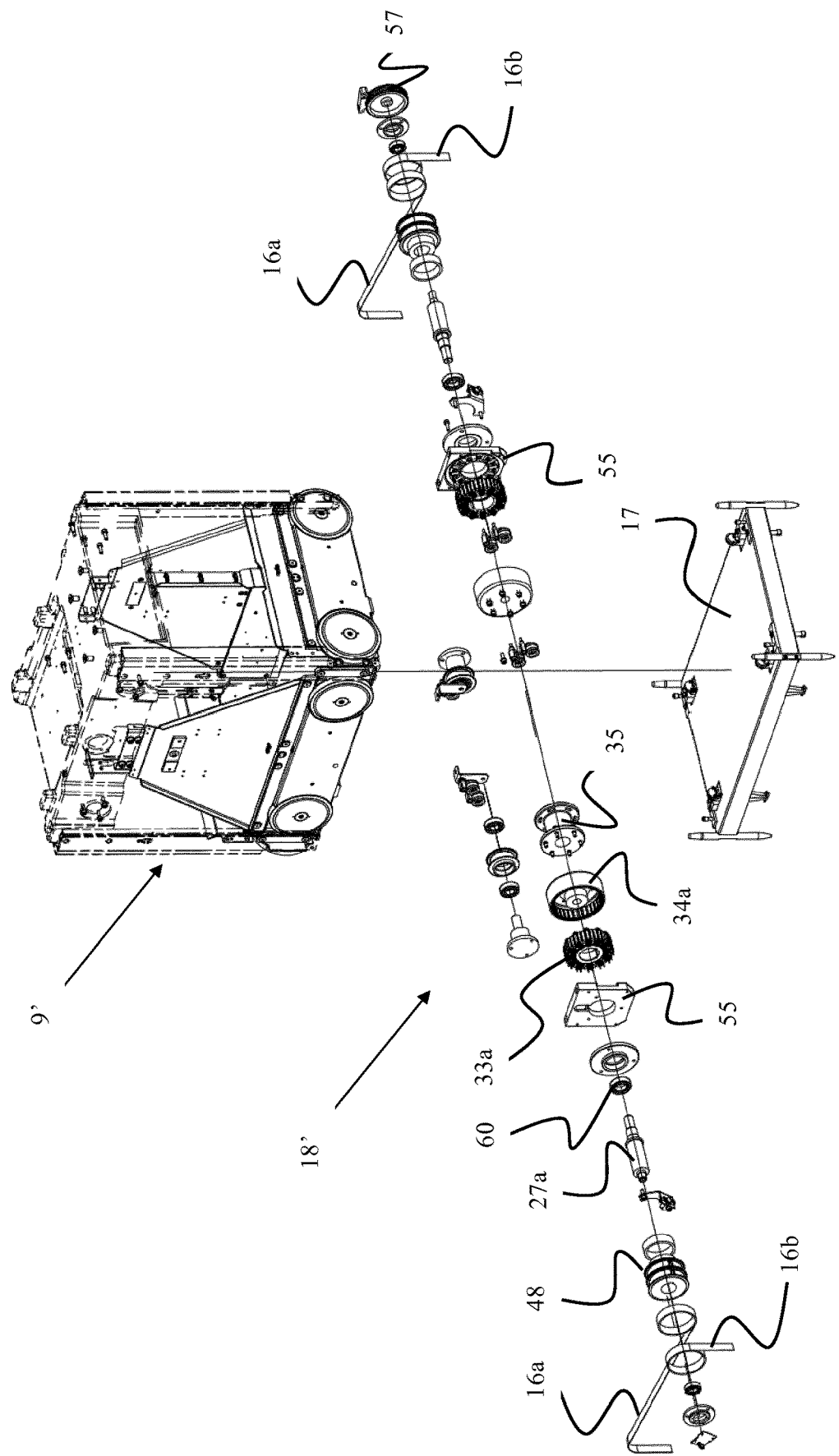
FIG. 10 is an exploded view of the lifting device of the container-handling vehicle in FIG. 5.

As shown in FIGS. 5 and 10, the lifting device 18' comprises a horizontal lifting shaft assembly 47 comprising a lifting shaft 22 and two electric motors 23a, 23b for rotating the lifting shaft 22, a lifting frame 17 for releasable connection to a storage container 6, and a first and second pair of lifting bands 16a,16b. The lifting bands 16a,16b connect the lifting shaft 22 to the lifting frame 17.

The lifting shaft 22 comprises a first end section 27a and a second end section 27b interconnected via an intermediate shaft element 35.

Each lifting band 16a,16b has a first end and a second end connected to the lifting shaft 22 and the lifting frame 17, respectively. Each pair of lifting bands 16a,16b has a first lifting band connected at the first end section 27a of the lifting shaft and a second lifting band connected at the second end section 27b of the lifting shaft.

The first pair of lifting bands 16a extends in a substantially horizontal direction from the lifting shaft 22 towards a pair of sheaves 31 (i.e. a band guiding assembly). The sheaves 31 are arranged to change the direction of the first pair of lifting bands 16a to extend in a vertical direction. The second pair of lifting bands 16b extends in a vertical direction directly from the lifting shaft 22.

The lifting band drive assembly of the presently disclosed container-handling vehicle 9', or lifting device 18', requires a minimum of separate parts, i.e. the lifting shaft assembly 47 and the pair of sheaves 31, to achieve its function.

When extending in the vertical direction, the lifting bands 16a,16b are arranged at a horizontal distance from each other corresponding to the horizontal distance between corresponding lifting band connecting elements 32 on the lifting frame 17.

By arranging the lifting shaft assembly 47 such that the second pair of lifting bands 16b extends vertically from the lifting shaft towards the corresponding band connecting elements 32 on the lifting frame 17, the lifting device 18' will occupy a minimum of space inside the robot. In other words, the required position and/or direction of the second pair of lifting bands 16b is obtained without an additional band guiding assembly. Further, by using a minimum of rotational parts (i.e. only the lifting shaft 22 and the sheaves 31) and no gears, sprockets and/or chains (commonly used in prior art lifting devices to transfer rotational movement from e.g. a motor to various shaft assemblies), the lifting device 18' is significantly more silent than prior art lifting devices. The latter is particularly important in a storage system comprising multiple container-handling vehicles.

Although the disclosed band guiding assembly comprises a pair of sheaves 31, it may alternatively be replaced by any suitable means for changing the direction of the first pair of lifting bands from a substantially horizontal direction to the vertical direction, such as a rotational shaft. In the container-handling vehicle 9', each of the sheaves 31 is separately connected to the vehicle body 13. However, depending on the specific design and space requirements, they may alternatively be arranged having a common shaft 53 extending between opposite sides of the vehicle body 13, see FIG. 19.

Figure 16:
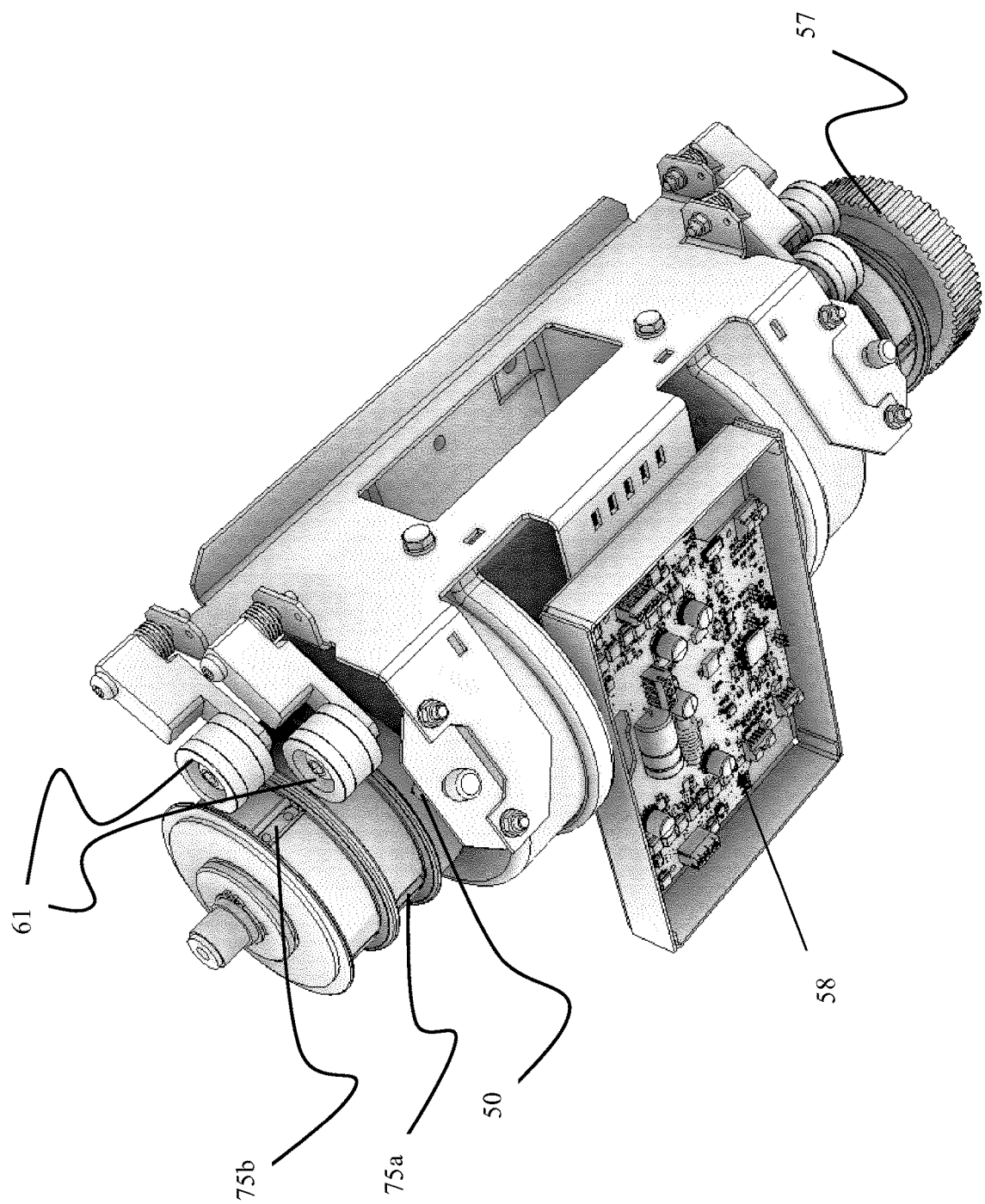
FIG. 16 is a perspective view from below of the lifting shaft assembly in FIGS. 14 and 15.
Figure 17:
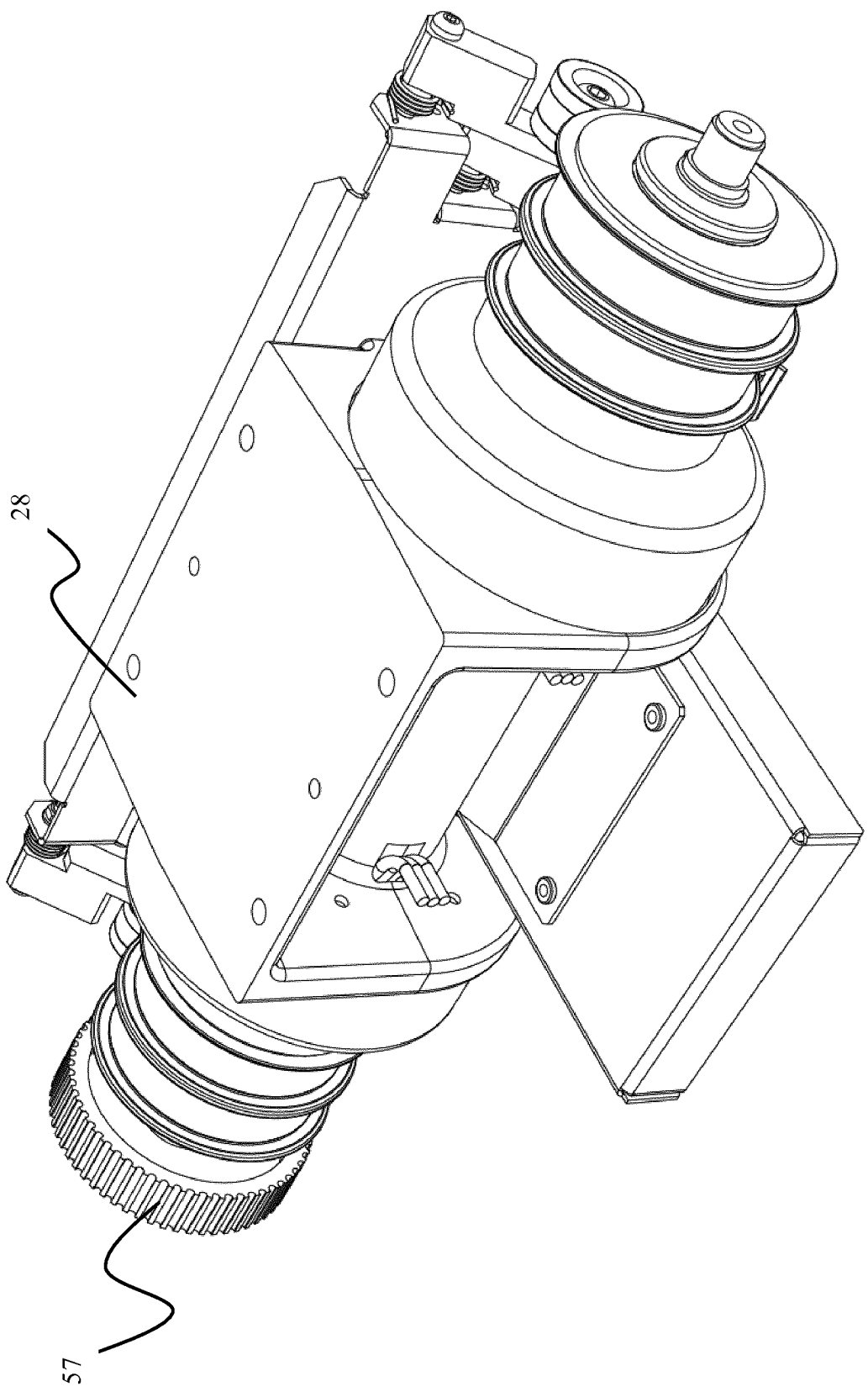
FIG. 17 is a perspective view from above of the lifting shaft assembly in FIGS. 14-16.
Figure 18:
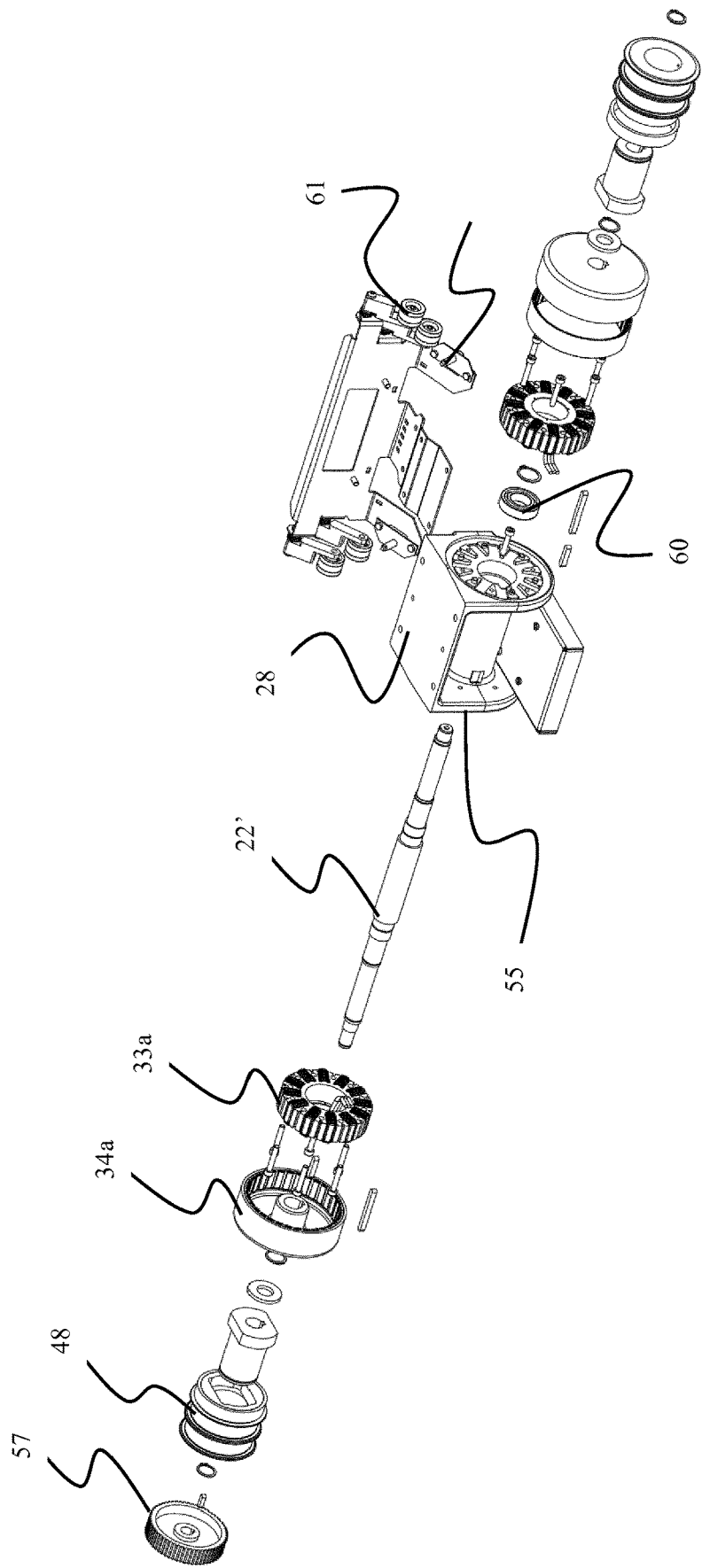
FIG. 18 is an exploded view of the lifting shaft assembly in FIGS. 14-17.

As shown in FIG. 16, spring-loaded guide wheels 61 are arranged to ensure correct travel and positioning of the lifting bands when spooled on/off the dual band reels 48 and when passing over the sheaves 31 of the band guiding assembly.

In the exemplary embodiment, the second pair of lifting bands 16b extends in the vertical direction from the lifting shaft 22 at the side of the lifting shaft facing away from the band guiding assembly 31. In this manner, the required horizontal position of the vertically extending second pair of lifting bands 16b, relative the corresponding band connecting elements of the lifting frame 17, is obtained while keeping the lifting device (and consequently the container-handling vehicle) as compact as possible. In other words, the horizontal extent of the lifting device does not significantly exceed the horizontal periphery of the lifting frame, which would be the case if the second pair of lifting bands 16b extended in the vertical direction from the lifting shaft 22 at the side of the lifting shaft facing the band guiding assembly 31.

Figure 12:
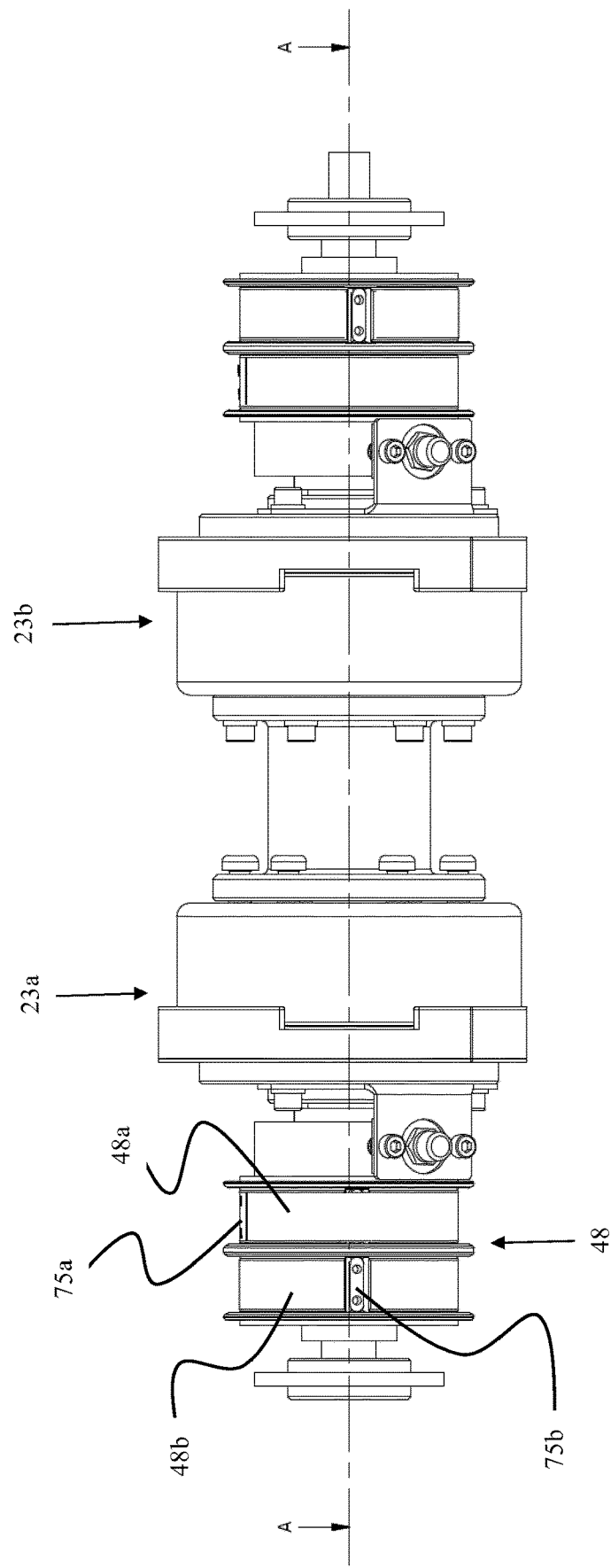
FIG. 12 is a side view of the lifting shaft assembly of the lifting device in FIGS. 10 and 11.
Figure 13:
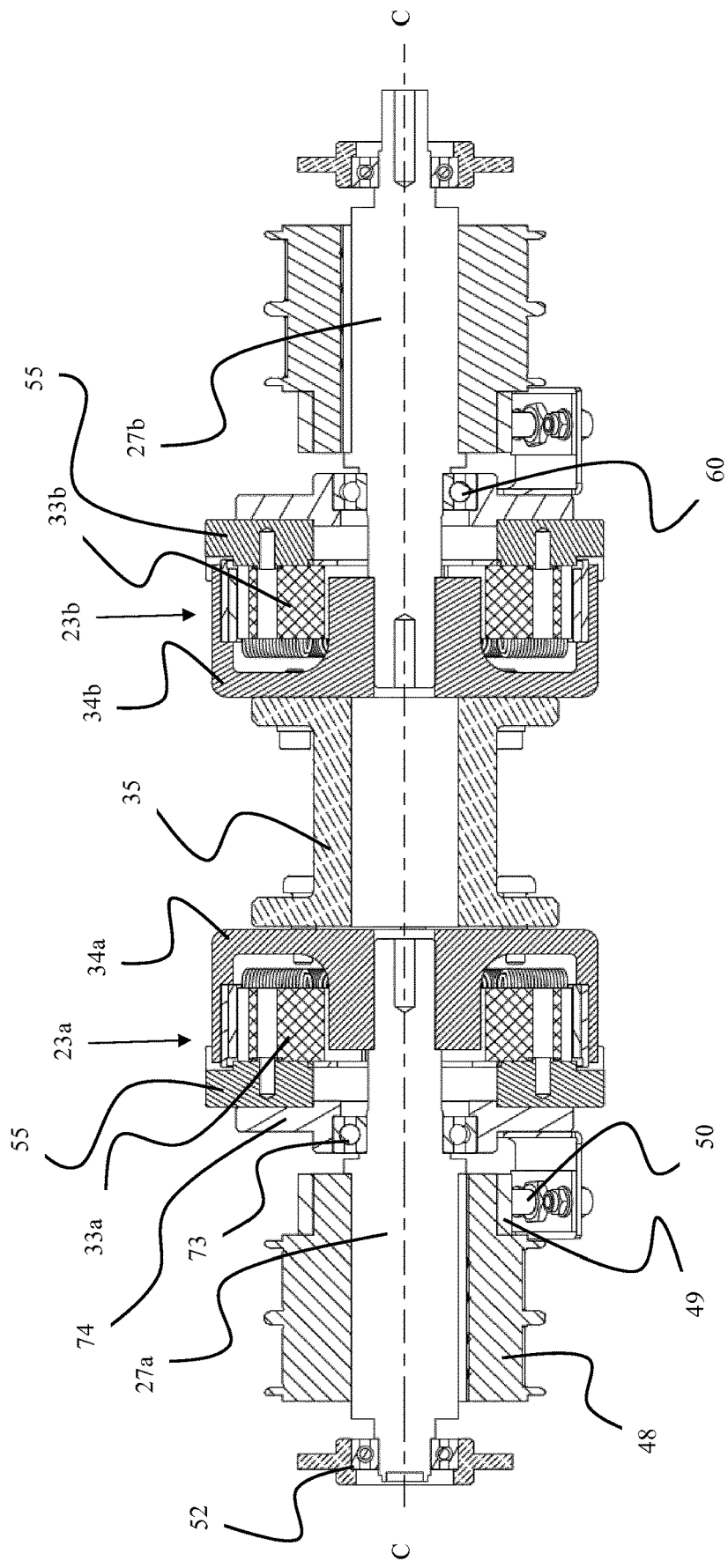
FIG. 13 is a cross-sectional view of the lifting shaft assembly in FIG. 12.
Figure 14:
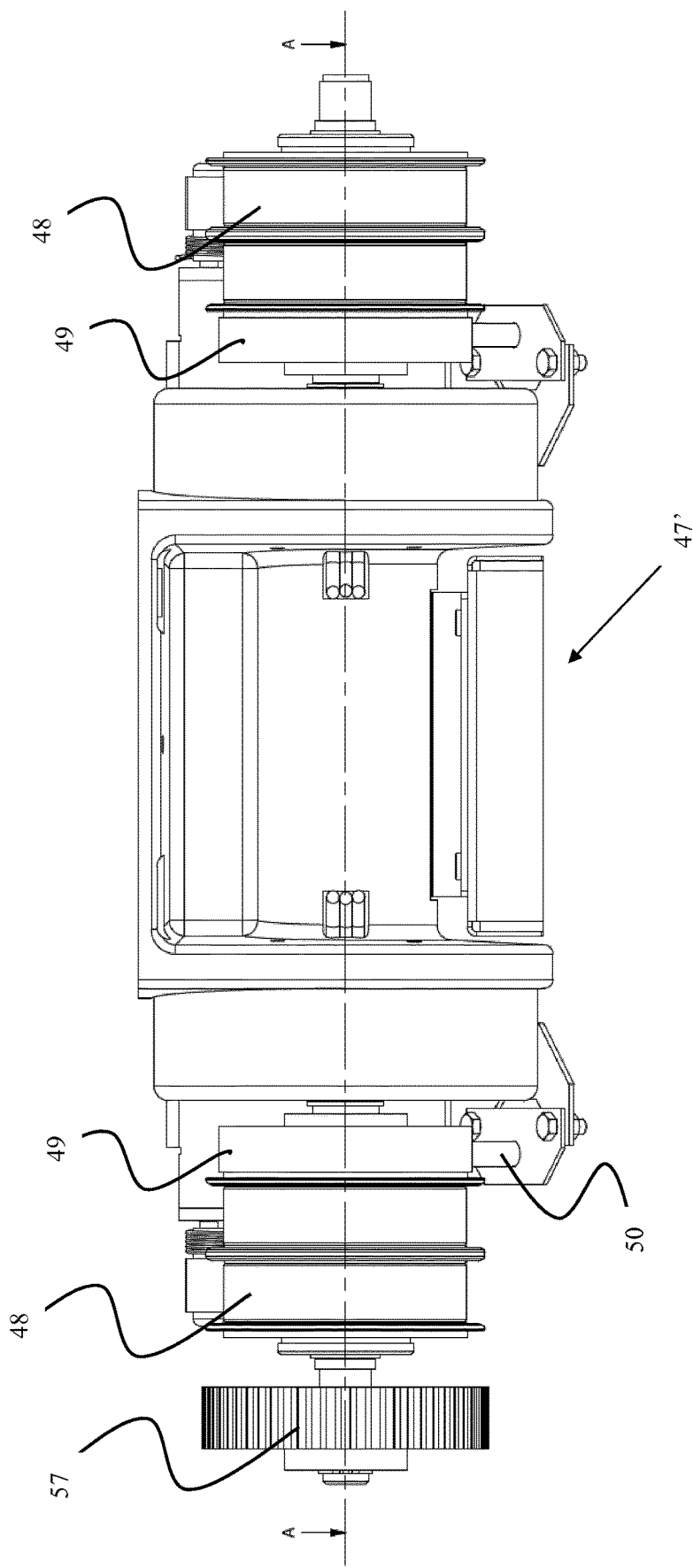
FIG. 14 is a side view of an alternative lifting shaft assembly for use in the lifting device in FIGS. 10 and 11.
Figure 15:
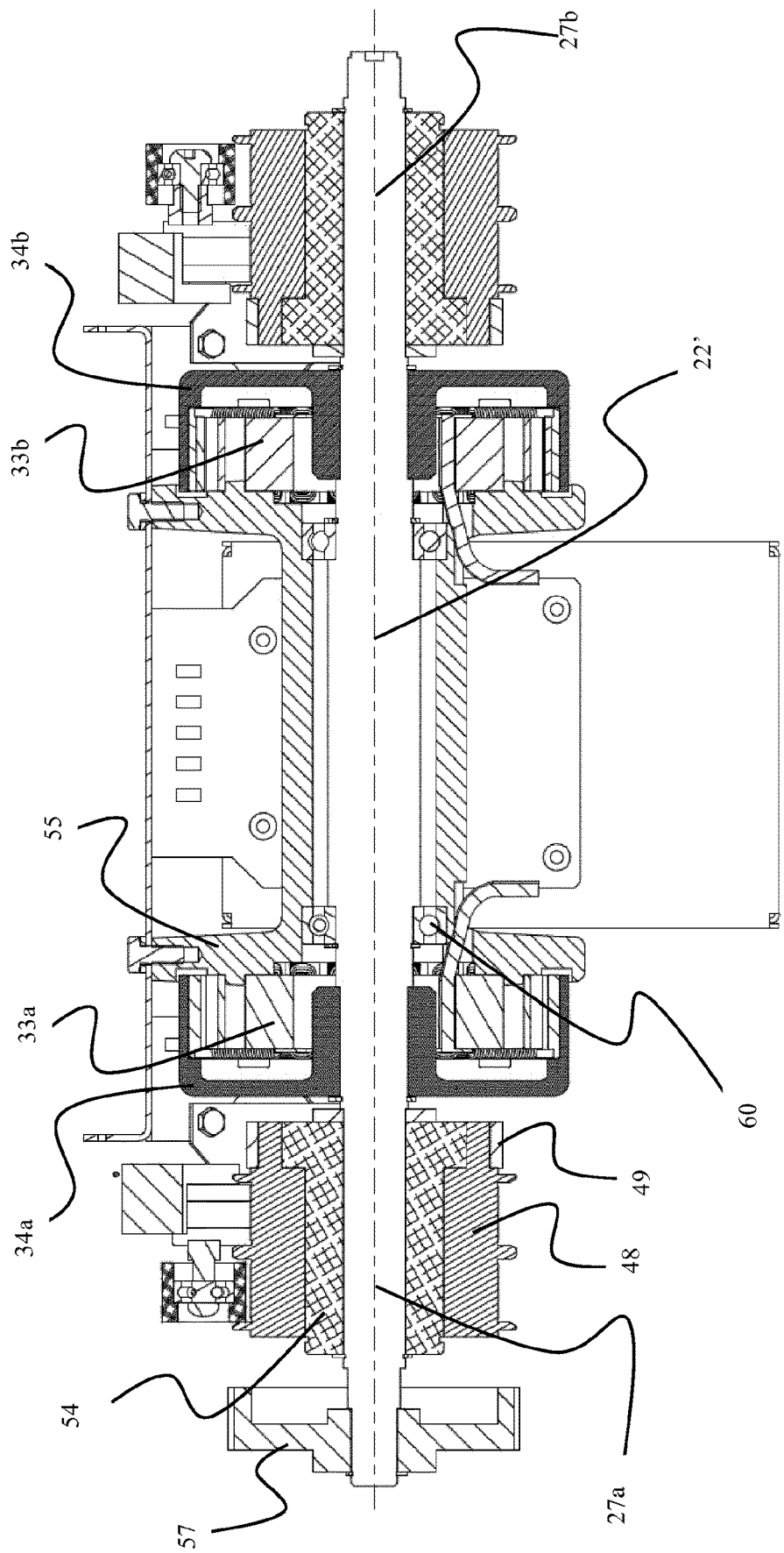
FIG. 15 is a cross-sectional view of the lifting shaft assembly in FIG. 14.

To provide secure spooling of the lifting bands onto the lifting shaft 22, a dual band reel 48, see FIGS. 12 and 13, is arranged at each of the end sections 27a,27b. The dual band reel 48 comprises a first reel sections 48a and a second reel section 48b. Each reel section features a reel band connector 75a,75b for connecting two separate lifting bands, in this case a lifting band from each of the first and second pair of lifting bands 16a,16b. In the lifting device 18' (as well as the lifting device 18" described below) the two pairs of lifting bands 16a,16b extend from the lifting shaft assembly 47 in two different directions, i.e. the first pair of lifting bands 16a extends in a substantially horizontal direction, while the second pair of lifting bands 16b extend in a vertical direction. To obtain an identical travelling distance of all the lifting bands when the lifting shaft is rotated, it is important that all lifting bands have the same length spooled onto the dual band reels at all times. The thickness of the lifting bands is usually about 0.15 mm and the travelling length of a lifting band per rotation of the lifting shaft (or dual band reel) is dependent on the number of layers of lifting band spooled onto the dual band reel. In the disclosed embodiments, this is obtained by having the two reel band connectors 75a,75b of each dual band reel 48 staggered in the range of 75 to 105 degrees, preferably about 90 degrees. In other words, the two reel band connectors 75a,75b are arranged on their corresponding reel section at a position displaced/staggered by about 90 degrees relative one another and the centreline of the lifting shaft. Further, the dual band reels 48 are arranged such that the reel band connectors 75a connecting the first pair of lifting bands have the same radial position (i.e. not staggered relative each other), and the reel band connectors 75b connecting the second pair of lifting bands have the same radial position. It is noted that the displacement/staggering of the reel band connectors 75a,75b is dependent on the positioning of the band guiding assembly relative the lifting shaft assembly.

It is noted, that in an alternative embodiment wherein all four lifting bands extend in a horizontal direction from the dual band reels, the displacement may be in the range of −15 to 15 degrees, preferably about 0 degrees, or in the range of 165 to 195 degrees, preferably about 180 degrees, depending on the band guiding assembly. That is, if all four lifting bands extend in the same horizontal direction, the reel band connectors are not staggered, i.e. all reel band connectors have the same radial position. If two of the four lifting bands, i.e. one lifting band from each of the dual band reels, extend in an opposite horizontal direction of the two other lifting bands, the reel band connectors are staggered by about 180 degrees. With reference to FIGS. 5-6, the latter embodiment would require an additional set of sheaves 31 arranged on the opposite side of the lifting shaft.

As discussed above, to obtain a correct length of all the lifting bands 16 relative the lifting frame, i.e. such that the lifting frame 17 is kept horizontal during operation, the length of the lifting bands must be adjusted both initially, as well as at various service intervals since they tend to elongate slightly during use. In the prior art lifting devices, the lifting bands are commonly connected and spooled onto separate reels arranged at an upper level within the container-handling vehicle 9. To adjust a lifting band, the corresponding reel may be disconnected from a rotational shaft and the lifting band adjusted by free rotation of the reel relative the rotational shaft. The reel is subsequently fastened to the rotational shaft when the lifting band has the desired length. To obtain access to the separate reels, a service person is commonly required to remove at least some of the bodywork covering the vehicle body 13 or enter the cramped interior of the cavity 21. A variant of the described prior art solution may also be adapted for the exemplary embodiment, e.g. by replacing each dual band reel with two separate band reels which may individually be released to allow free rotation relative to the lifting shaft 22 when the bands are to be adjusted. However, a more efficient and novel solution as described below is preferred.

Figure 8:
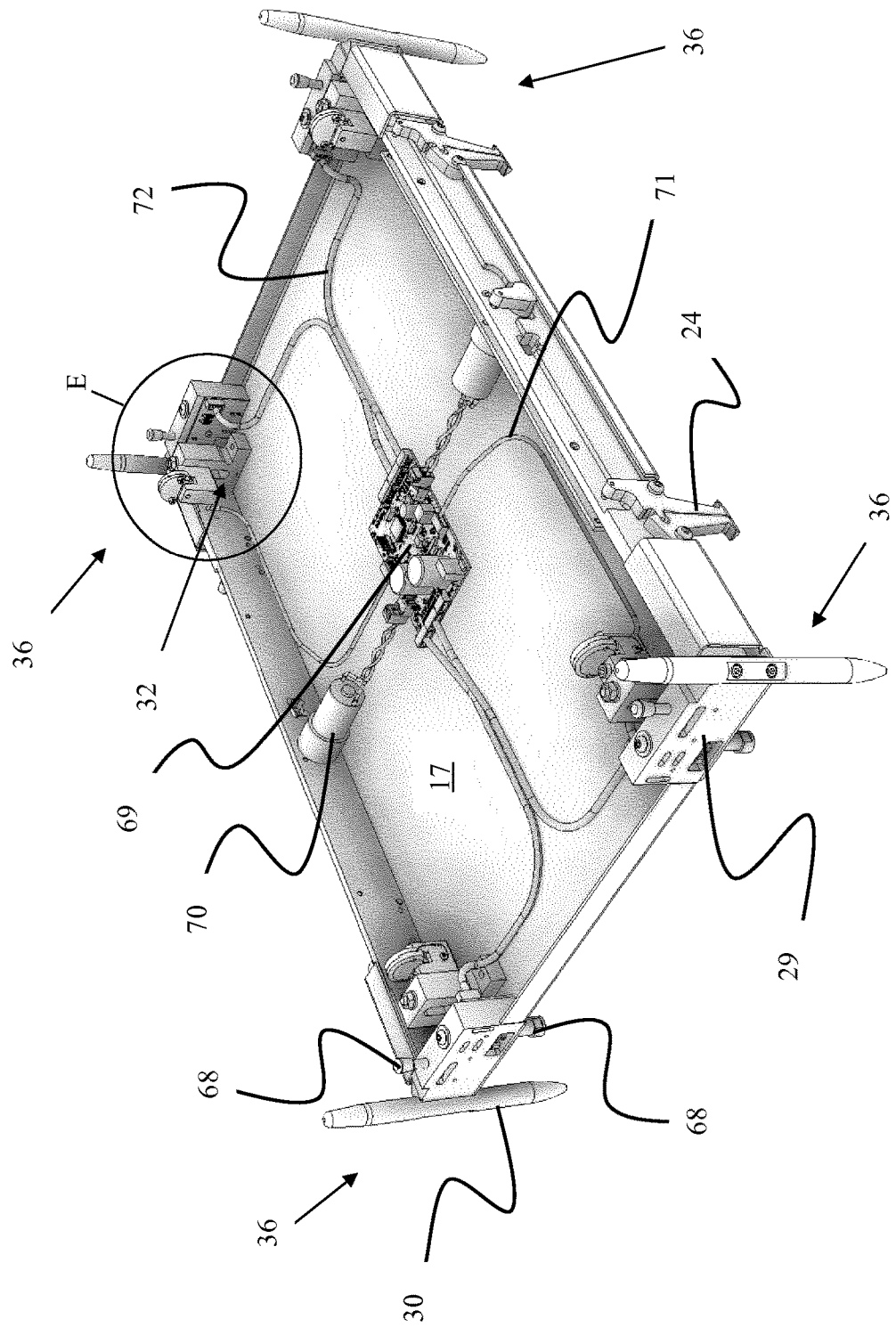
FIG. 8 is a perspective side view of a lifting frame of the container-handling vehicle in FIGS. 5-7.

In the exemplary embodiment, lifting band adjustment is obtained by using a lifting frame 17 featuring adjustable lifting band connectors 32 (or band connecting elements), see FIGS. 7-9. The lifting frame comprises four corner sections 36, a top side 37 and a bottom side 38. Four gripper elements 24 for interaction with a storage container are arranged at the bottom side 38 of the lifting frame 17. A vertical guide pin 30 and a vertically adjustable lifting band connector 32 are arranged at each corner section 36.

As shown in FIGS. 9a-9c, each lifting band connector 32 comprises a bracket 39 and a band connector hub 40. The bracket 39 is rigidly connected at the top side of the lifting frame 17. The band connector hub 40 comprises a lifting band clamp 41 (i.e. a band fastening assembly) and is adjustably connected to the bracket 39, such that the band connector hub 40 may be adjusted in a vertical direction relative the bracket 39. The band connector hub 40 is connected to the bracket 39 via an adjustment bolt 42 (i.e. an adjustment element) arranged such that rotation (i.e. actuation) of the adjustment bolt will move the band connector hub 40 in a vertical direction relative the bracket 39. The bracket features a vertical recess/cut-out 43 and the band connector hub 40 comprises an extension 44 arranged in the vertical recess. The recess comprises two vertically opposite smooth bores 45 and the extension features a threaded bore 46 arranged in line with the smooth bores 45. By having the adjustment bolt 42 arranged in the smooth bores and the threaded bore, rotation of the adjustment bolt 42 will move the band connector hub 40 in a vertical direction relative the bracket. Thus, the distance between the lifting frame 17 and the vehicle body 13 may be adjusted such that the lifting frame is horizontal. The feature of being able to adjust the lifting bands at the lifting frame is highly advantageous, since internal access to the body of the container-handling vehicle is not required. Further, the lifting shaft assembly is simplified in that the dual band reels 48 upon which the lifting bands are spooled do not have to be releasably connected to the lifting shaft 22. The latter also entails that the lifting assembly, and any other systems present at an upper level within the container-handling vehicle, may be constructed in a manner not having to take into consideration a required access to the reels. It is noted that the solution of having adjustable lifting band connectors on the lifting frame would be highly advantageous also in the prior art container-handling vehicles.

Metal lifting bands may tear if subjected to unbalanced and high loads. To minimize the risk of unbalanced loads and tearing, the lifting band connector comprises a pivot point P allowing some movement of the lifting band connector in the vertical plane of the connected lifting band, i.e. the pivot point has a centre axis perpendicular to the vertical plane of the lifting band. In the lifting band connector 32, the pivot point P is obtained by a pivot connection 67 between the lifting band clamp 41 and the remainder of the band connector hub 40.

By use of the present lifting frame 17, as well as the lifting frame 17' shown in FIGS. 20-23, the lifting bands may be adjusted in an easy and time efficient manner. When an adjustment is required (i.e. the lifting frame tilts slightly relative the horizontal plane; a situation that may cause the lifting frame getting stuck inside a storage column 12, see FIG. 1.), the following steps may be performed:

arranging the container-handling vehicle at a suitable location, for instance at an empty grid column at the periphery of the storage grid 4;

lowering the lifting frame out of the cavity of the container-handling vehicle, such that a service person has access to the lifting frame; and adjusting the lifting band(s) by movement of the band connector hub of the respective lifting band connector 32, such that the lifting frame is in the horizontal plane. In the specific lifting band connector disclosed in FIGS. 7-9, this step will entail rotation of the respective adjustment bolt(s) (i.e. the adjustment element(s)).

In some instances, when lowered out of the cavity, the lifting frame is lowered to a base structure on which the frame is supported in the desired horizontal position. When the lifting frame is kept horizontal, the lifting band(s) which has been elongated/stretched during use is no longer tensioned, i.e. the elongated/stretched lifting band(s) has some slack relative the other lifting bands. The lifting band adjustment is then easily performed by simply tensioning the slack lifting band(s) by use of the respective adjustable lifting band connector 32.

In the exemplary embodiment, as well as in some prior art container-handling vehicles, the lifting bands are made of metal (commonly a steel alloy) and are used to conduct signals and electric power to end switch modules 29 and a control module 69 arranged on the lifting frame 17. The end switch modules 29 comprises spring-loaded pins 68 (see FIG. 21) for detecting when the lifting frame is in contact with a storage container 6 and when the lifting frame is raised to its uppermost level within the cavity. To avoid short-circuiting the signal/electric power passing through the lifting bands, at least parts of the bracket 39 is made in a non-conducting material, such as a suitable plastic or composite material, such that the lifting bands (i.e. a lifting band from each of the dual band reels 48) are only in electric contact (via wires 71) with the lifting frame 17 at the control module 69. Thus, at least parts of the lifting band clamp 41 is made in an electrically conductive material, e.g. any suitable metal.

Each end switch module 29 is electrically connected (wires 72), via the control module to two lifting band clamps 41 (or band connector hubs) having a different potential, such that signals/electric power may be received from, or sent to, a main control unit (not shown, but similar to the main control unit 58 in FIG. 16) inside the container-handling vehicle.

The control module 69 is also connected to and controls gripper motors 70 which drive the gripper elements 24.

To transfer signals/electric power from the main control unit, each dual band reel 48 features a slip ring 49 for electric signal transfer between the main control unit and the lifting bands via a conducting brush 50 in contact with the slip ring 49, see FIG. 13. The dual band reels are made in an electrically conducting material, such as a suitable metal. Although shown as a single reel, each dual band reel may comprise to distinct reels, one for each lifting band, as long as the two distinct reels are in electric contact with each other and the slip ring.

Figure 11:
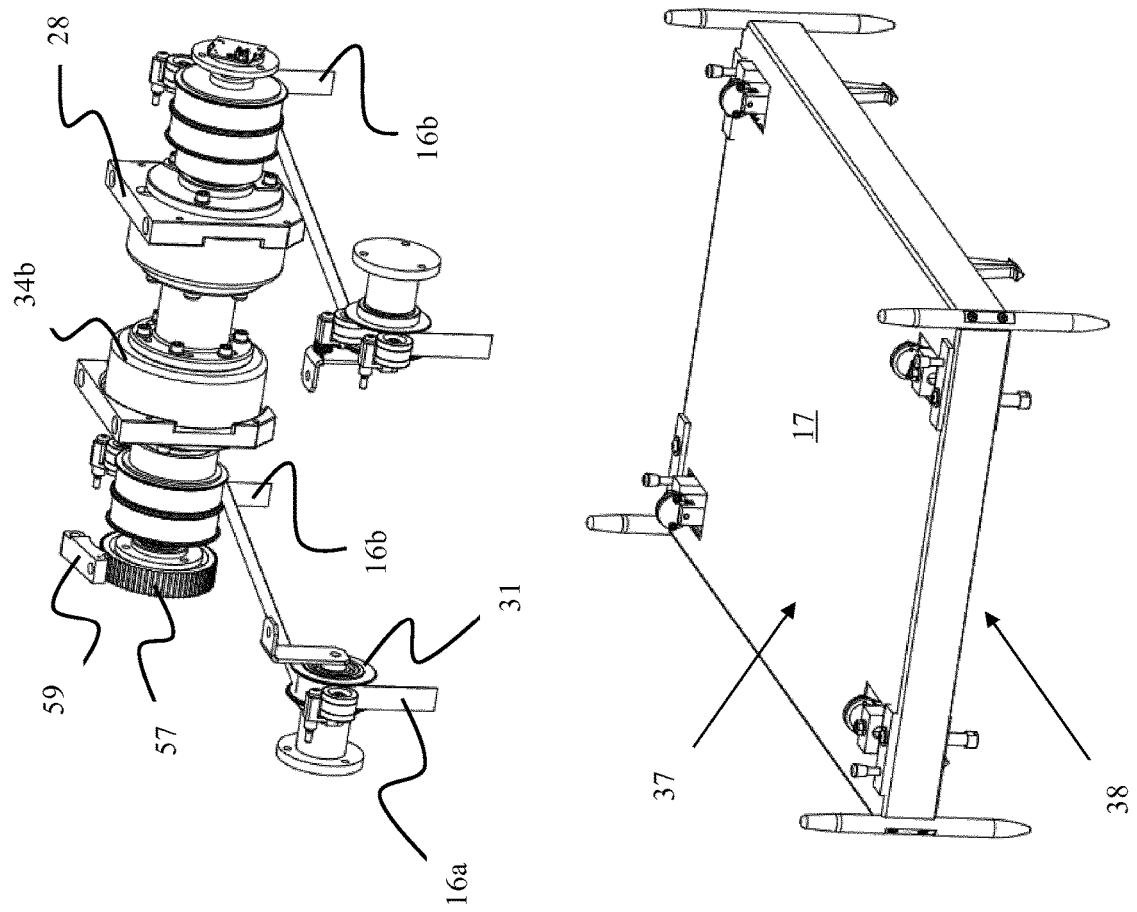
FIG. 11 is a perspective side view of the lifting device of the container-handling vehicle in FIG. 5.

For illustrative purposes, the lifting device 18' (i.e. the lifting shaft assembly 47, the lifting frame 17 and the two pairs of lifting bands) is shown in an exploded view in FIG. 10 and in a perspective view isolated from the vehicle body 13 in FIG. 11.

In the lifting shaft assembly 47, the two electric motors 23a, 23b are brushless DC (BLDC) electric motors, each comprising a stator 33, a stator connecting element 55 and a rotor element 34, see FIGS. 12 and 13. To transfer rotary motion from the rotor elements 34a,34b of the electric motors to the lifting shaft 22 (i.e. the shaft made up of the first end section 27a, the second end section 27b and the intermediate shaft element 35), the rotor elements 34a,34b are interconnected via the intermediate shaft element 35 and each rotor element is connected to a respective end section 27a,27b. The rotor elements, the end sections and the intermediate shaft element have a common centreline C. To allow spooling of all the lifting bands (i.e. both pairs of lifting bands 16a,16b) onto a single lifting shaft 22, while at the same time being able to use the lifting bands as conductors for signals/electric power, as described above, the dual band reels 48 (or the end sections 27a,27b) must be electrically insulated from each other. In this manner the lifting bands connected to the dual band reel 48 at the first end section 27a may have a differential electric potential relative the lifting bands connected to the dual band reel 48 at the second end section 27b. In the lifting shaft assembly 47, this is achieved by having the intermediate shaft element 35 made in an electrically insulating material (i.e. providing an electrical insulating element), such as a suitable plastic/composite material.

The lifting shaft assembly 47 comprises a ball bearing element 52 on each of the end sections 27a,27b for rotatable connection of the end sections to the body 13 of the container-handling vehicle. The stator connecting element 55 of each stator 33a,33b comprises a motor bracket 28 for rigid connection to the body 13 of the container-handling vehicle and a ball bearing 60 for rotary connection to the lifting shaft. In this manner, the lifting shaft 22 is rotatable relative the body 13, while the stators are kept stationary. To avoid short-circuiting via the vehicle body 13, the ball bearing elements 52 has a plastic housing insulating the respective end sections from the vehicle body 13. Similarly, the stator connecting elements 55 are insulated from the end sections 27a,27b by the plastic housings 74 of the ball bearing elements 73 to avoid short circuiting via the motor brackets 28.

An alternative embodiment of a lifting shaft assembly 47' is shown in FIGS. 14-18.

A major differentiating feature of the alternative lifting shaft assembly 47', in view of the lifting shaft assembly 47 described above, is the construction of the lifting shaft 22' as a single element, i.e. the lifting shaft 22' may be termed a unitary lifting shaft. In the lifting shaft assembly 47, the intermediate shaft element 35, interconnecting the first end section 27a and the second end section 27b, is able to electrically insulate the two end sections, and consequently the two dual band reels 48, by being made in an electrically insulating material. To obtain the same feature of electrically insulating the dual band reels 48, the alternative lifting assembly 47' features a sleeve-shaped element 54 made of electrically insulating material (i.e. an electrical insulating element) arranged between each of the first end section 27a and the second end section 27b and the corresponding dual band reels 48 (alternatively, each dual band reel 48 may be defined as comprising an inner section/element 54 in an electrically insulating material). An advantageous effect of insulating each dual band reel from its respective end section is that the lifting shaft assembly 47' is not required to be electrically insulated from the vehicle body 13 at its contact points, e.g. ball bearings 52, see above.

The motor(s) 23 of the lifting shaft assembly 47' features two stators 33a,33b, two rotor elements 34a,34b and a stator connecting element 55 being common for both stators 33a,33b. The stator connecting element 55 comprises a motor bracket 28 for rigid connection to the body 13 of the container-handling vehicle and ball bearings 60 for rotary connection to the lifting shaft 22'. A lift brake wheel 57 is arranged at one end of the lifting shaft assembly 47'. To actuate the brake wheel, a cooperating brake actuator arm 59 is commonly connected to the vehicle body 13.

Figure 19:
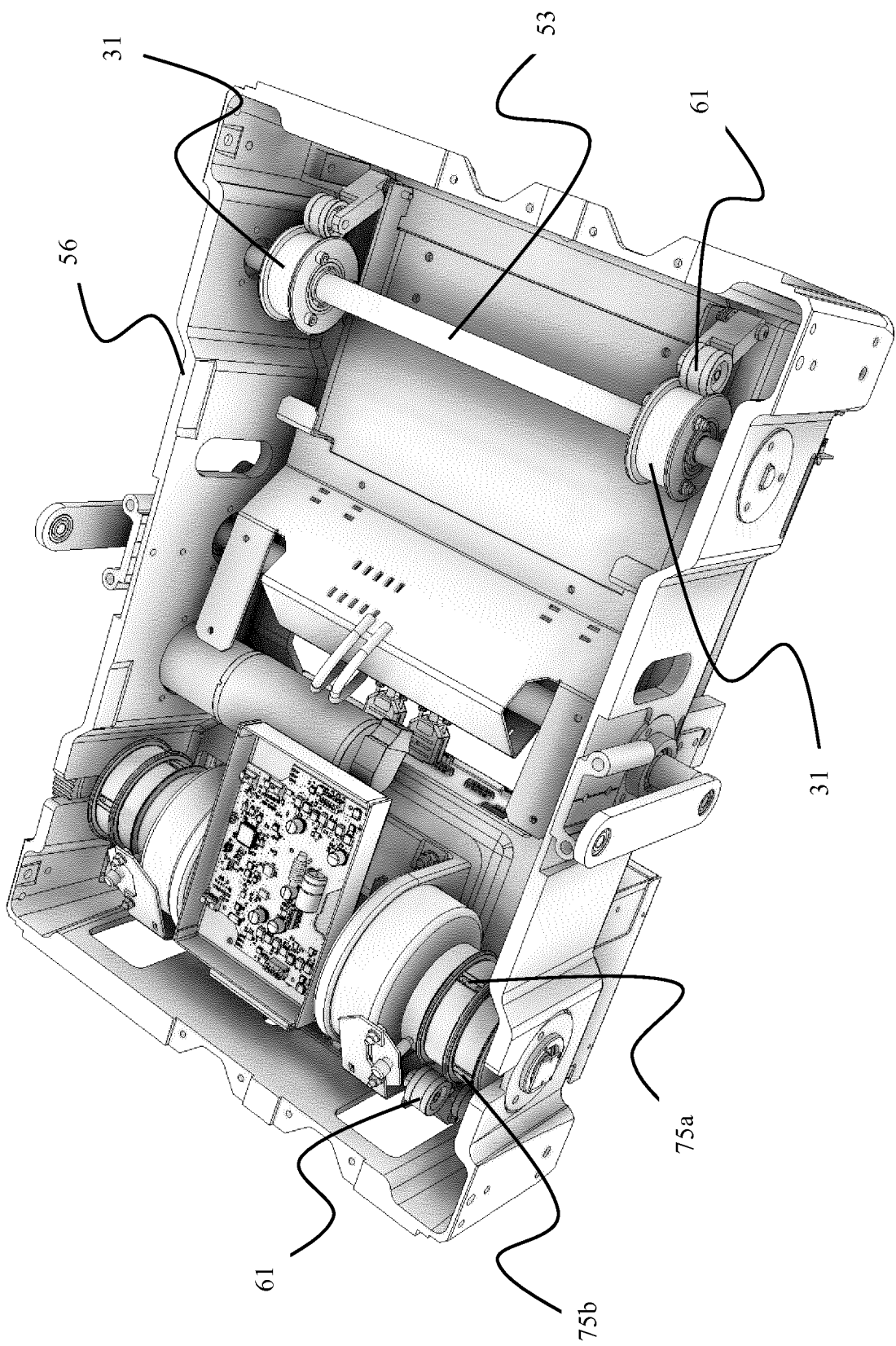
FIG. 19 is a perspective view from below of a lifting device frame comprising the lifting shaft assembly in FIGS. 14-17.
Figure 20:
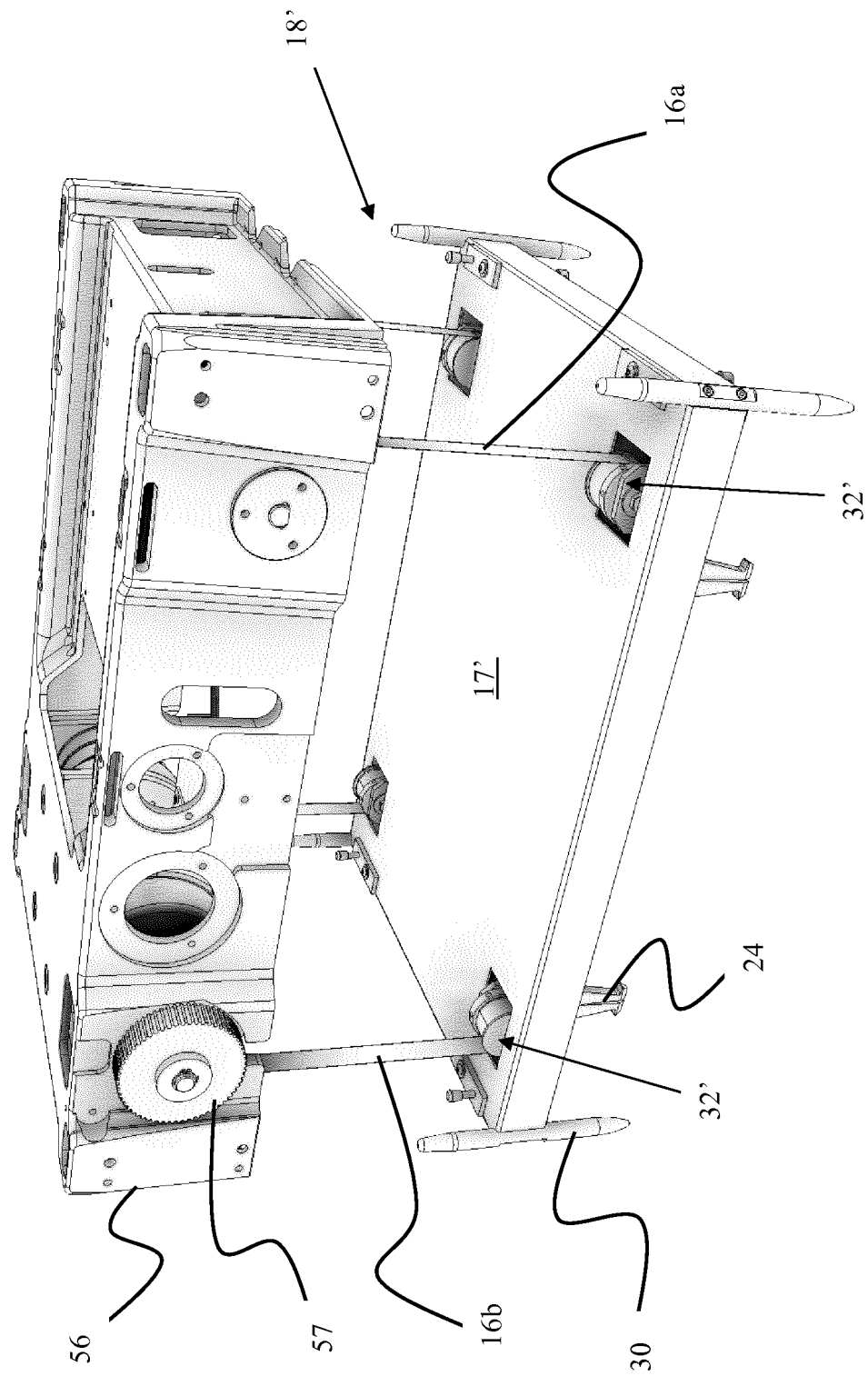
FIG. 20 is a perspective side view of the lifting device frame in FIG. 19 comprising lifting bands and a lifting frame.

A lifting device 18" based on the alternative lifting shaft assembly 47' is shown in FIGS. 19 and 20. In this specific embodiment, the lifting device 18" is arranged in a frame 56. The frame 56 constitutes an upper part of the vehicle body 13 of an assembled container handling vehicle 9', see FIG. 23.

Figure 21:
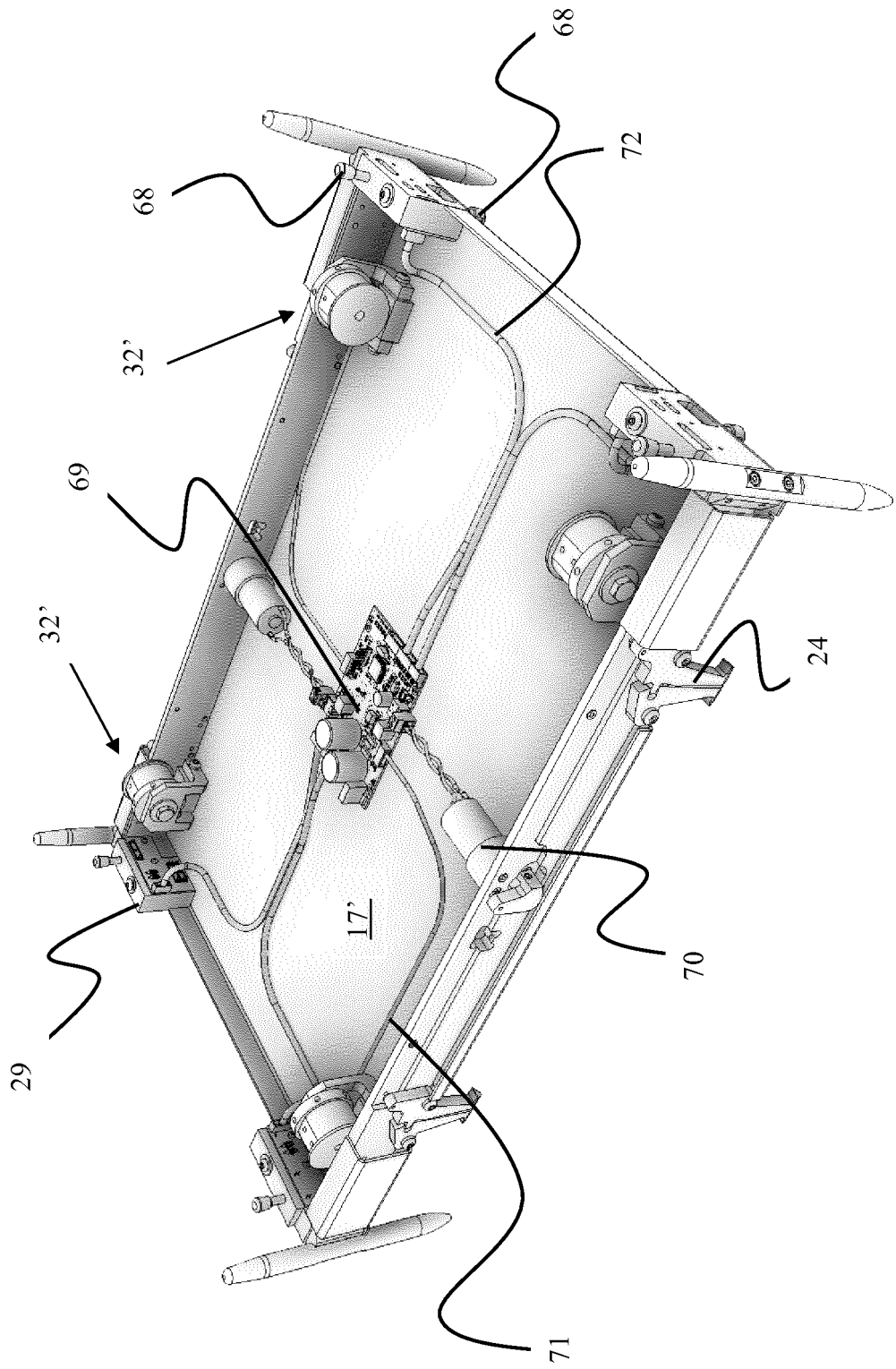
FIG. 21 is a perspective side view of the lifting frame shown in FIG. 20 with a top cover omitted.

The lifting frame 17' of the lifting device 18' has most of its features in common with the lifting frame disclosed in FIGS. 7-9, but comprises an alternative type of adjustable lifting band connectors 32', see FIGS. 21 and 22. Each of the adjustable lifting band connectors 32', see FIGS. 21 and 22, comprises a bracket 39' and a band connector hub 63,64. A pivot point P is obtained by having the bracket 39' pivotally arranged at an upper side of the lifting frame 17' via a pivot connection 66 to a connecting block 62 (or intermediate bracket element). The purpose of the pivot point P is described above in connection with the lifting band connector 32 in FIGS. 7-9. The band connector hub comprises a lifting band reel 63 and a locking bolt 64 (i.e. an adjustment element). The lifting band reel features a connecting interface 65 for a lifting band (i.e. a band fastening assembly) and is rotatably connected to the bracket 39'. The rotational connection of the lifting band reel is controlled by the locking bolt 64. When the locking bolt 64 is tightened the lifting band reel 63 is prevented from rotating, and when the locking bolt is loosened, rotation of the lifting band reel is allowed. By rotating the lifting band reel, the lifting band connected thereto may be spooled on/off such that the distance between the lifting frame and the vehicle body may be adjusted. An advantage of the lifting band connectors 32' is that the vertical adjustment range is increased. To avoid short-circuiting, at least parts of the lifting band connectors, such as the bracket 39' or the connecting block 62, are made in a non-conducting material, such as a suitable plastic or composite material.

Figure 23:
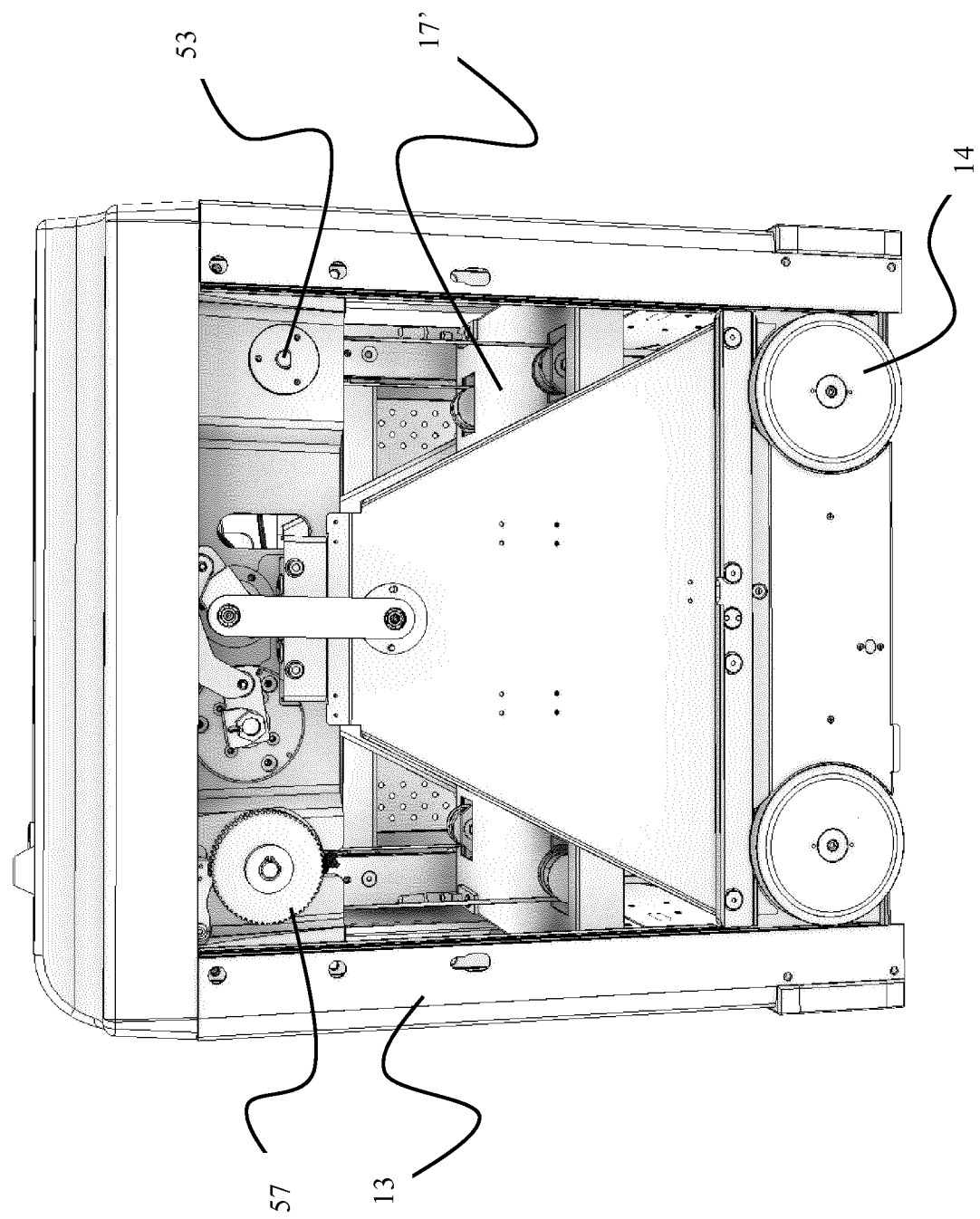
FIG. 23 is a side view of a container-handling vehicle comprising a lifting frame and lifting device as shown in FIG. 20.

A container-handling vehicle featuring a frame 56 and lifting device 18' is shown in FIG. 23.

Figure 24:
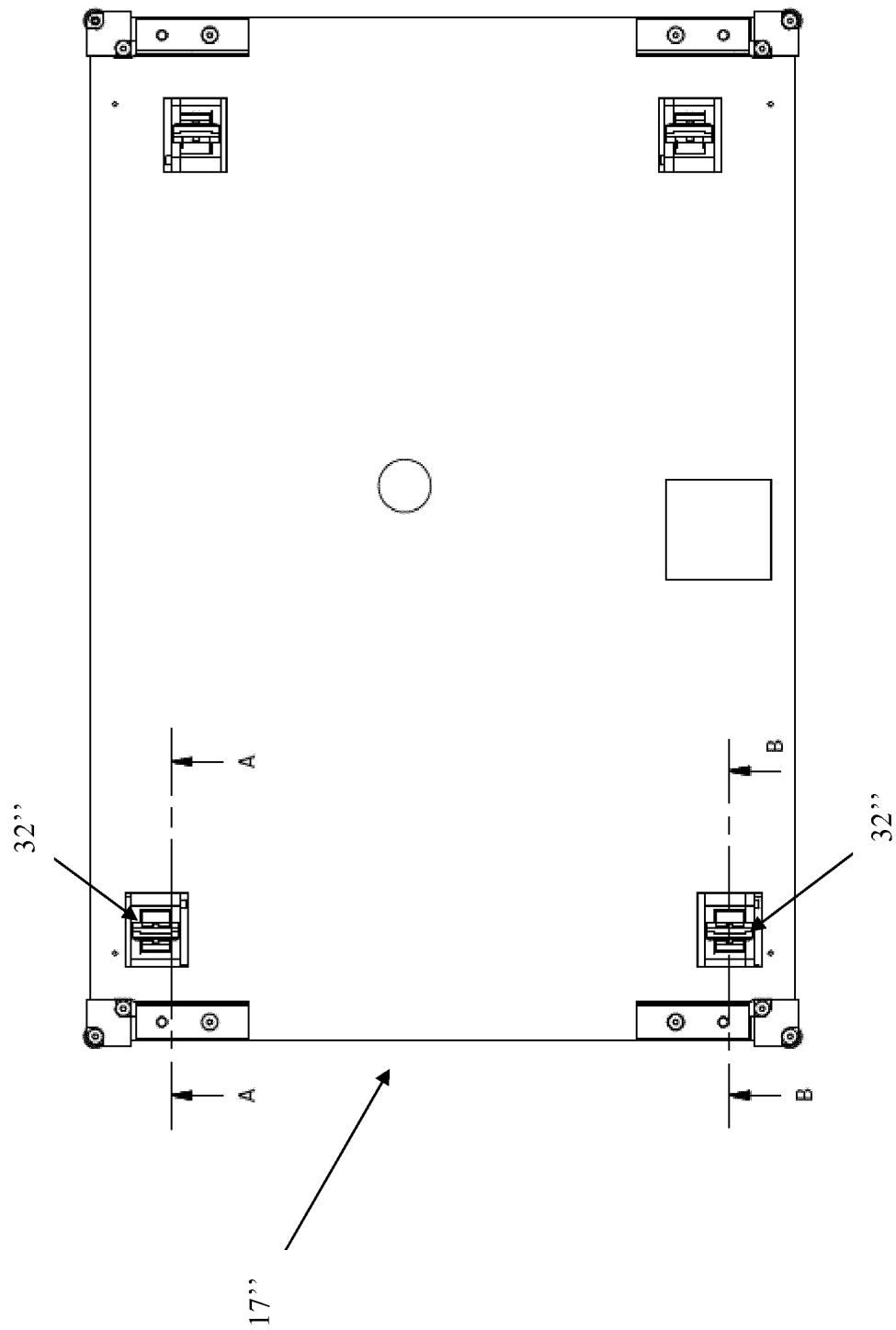
FIG. 24 is a topside view of an exemplary lifting frame for use in a container-handling vehicle according to the invention.
Figure 25:
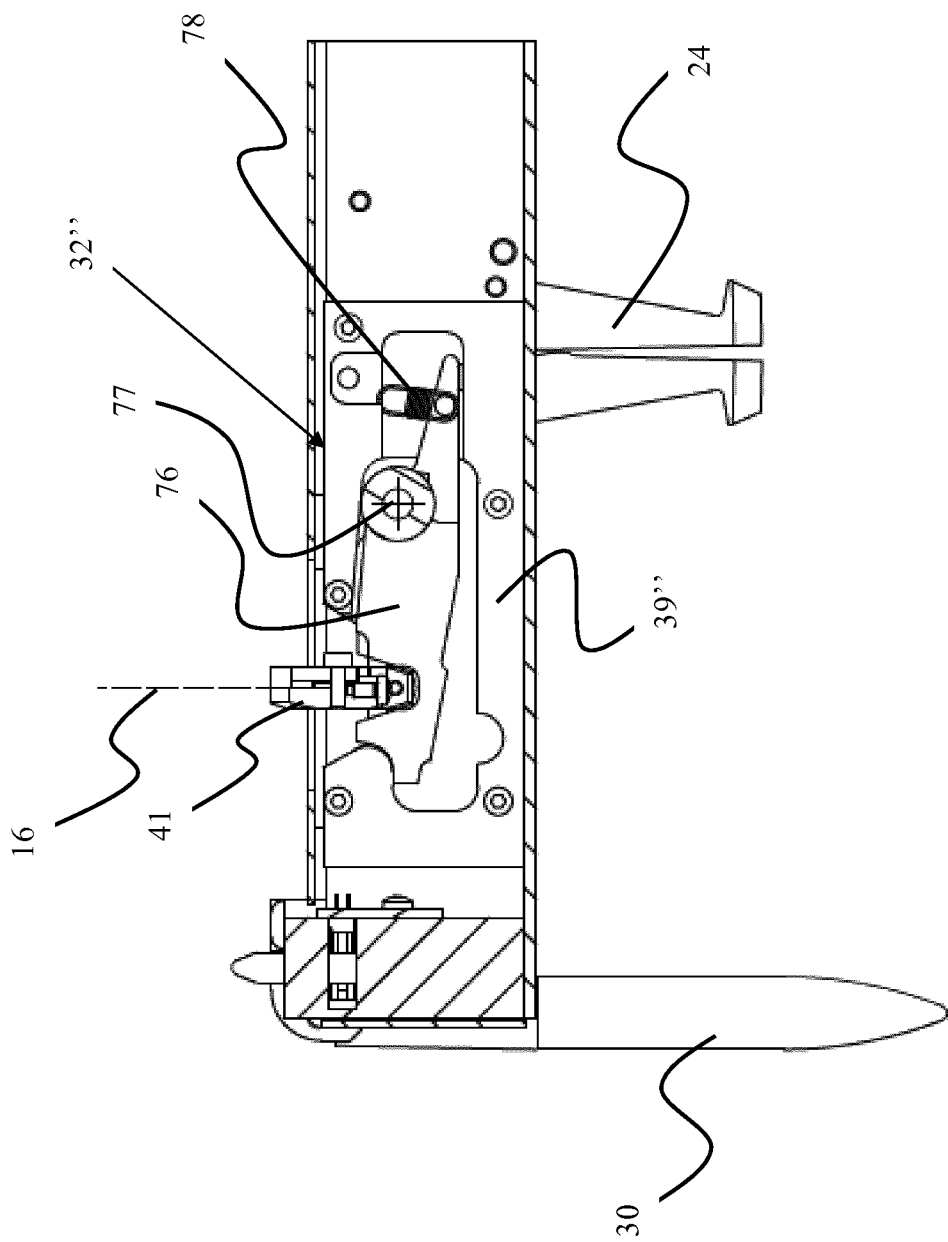
FIG. 25 is a cross-sectional view A-A of the lifting frame in FIG. 24 showing an exemplary adjustable band connector.
Figure 26:
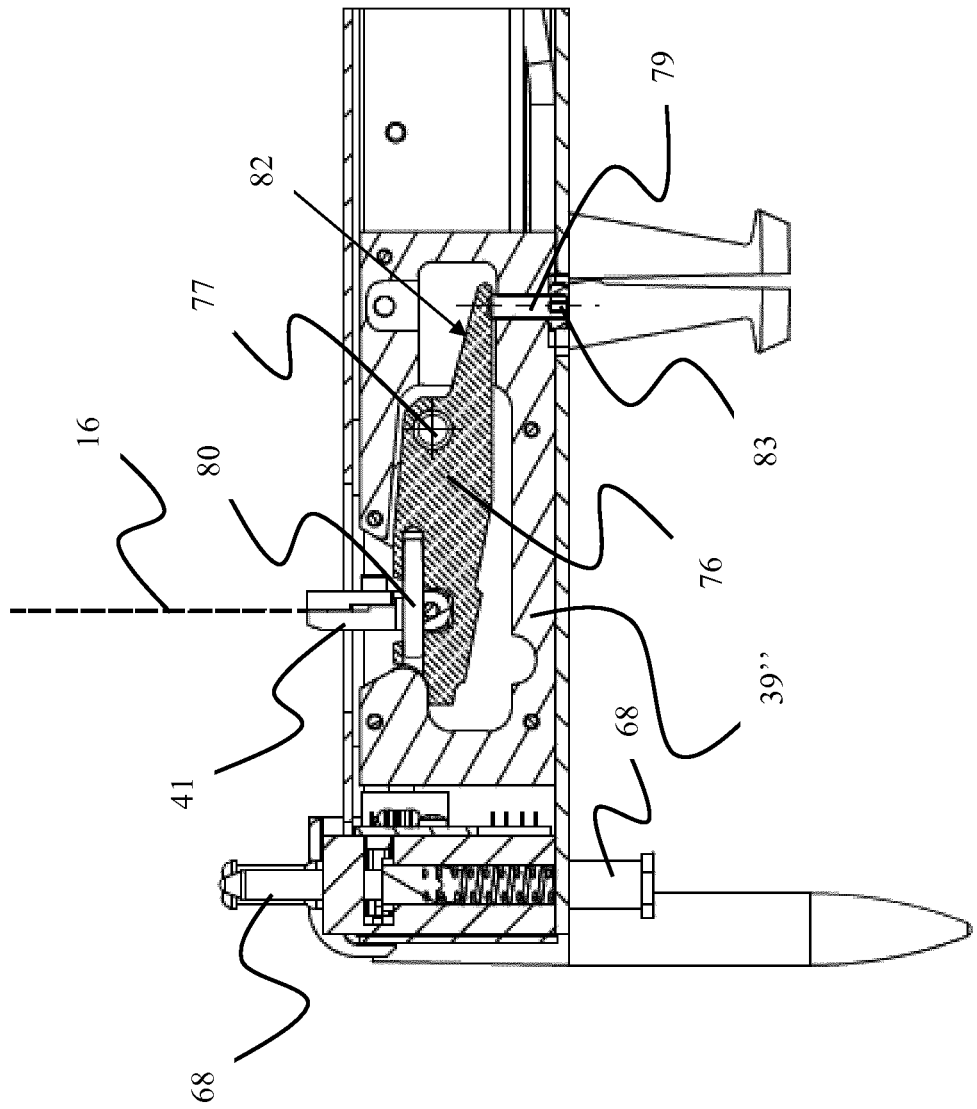
FIG. 26 is a cross-sectional view B-B of the lifting frame in FIG. 24 showing an exemplary adjustable band connector.
Figure 27:
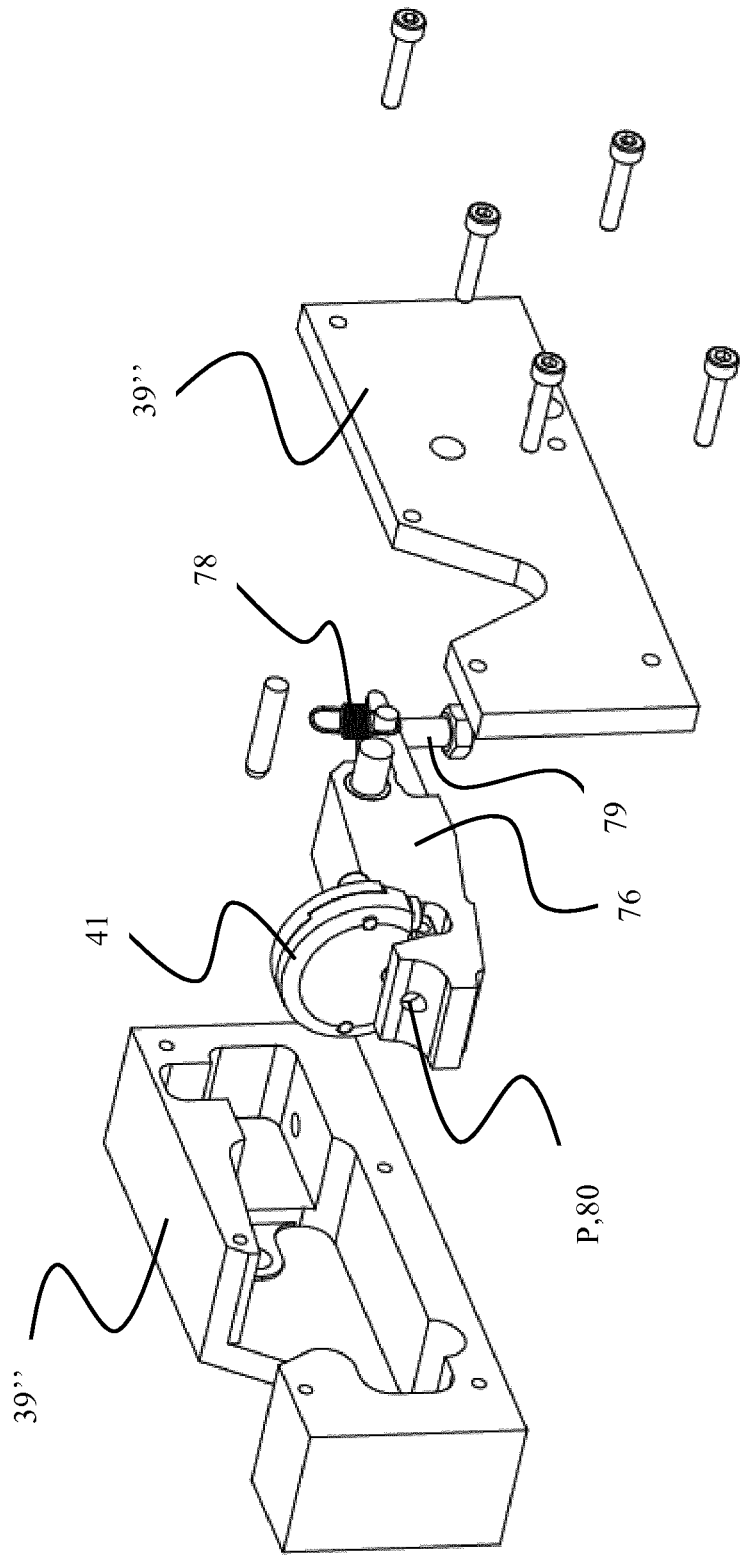
FIG. 27 is an exploded view of the adjustable band connector in FIGS. 24-26.

A further embodiment of a lifting frame 17" featuring four exemplary adjustable lifting band connectors 32" is disclosed in FIGS. 24-26. An exploded view of the adjustable lifting band connector is shown in FIG. 27.

The lifting frame 17" has most of its features in common with the lifting frames 17,17' described above and the common features are provided with the same reference numbers.

Each of the adjustable lifting band connectors 32" features a bracket 39" and a lever 76. The bracket 39" is rigidly connected at an upper side of the lifting frame 17". A lifting band clamp 41 (i.e. a band fastening assembly) is connected at one end of the lever 76 (i.e. the lifting band clamp and lever constitutes a band connector hub), and the lever is connected to the bracket 39" by a pivot connection 77. By pivoting the lever 76 around the pivot connection 77, the vertical level of the lifting band clamp relative the bracket may be moved between a lower level (i.e. a first position) and an upper level (i.e. a second position). In FIGS. 25 and 26, the lifting band clamp 41 is shown in an uppermost level. The lifting band clamp 41 is biased towards the lower level by a spring 78 arranged between the lever and the bracket. An adjustment bolt 79 is arranged to set the upper level of the lifting band clamp. The adjustment bolt will abut with the lever 76 when the lifting band clamp is at the set upper level. In this embodiment, the spring 78 and the adjustment bolt 79 interact with a section 82 of the lever 76 arranged opposite of the lifting band clamp 41 relative the pivot connection 77. In this manner, the head 83 of the adjustment bolt 79 may be reached from a lower side of the lifting frame 17", a feature that may in some situations facilitate the adjustment of the lifting band connector 32". However, in further embodiments of the lifting band connector it is also envisioned that the adjustment bolt 79, and optionally the spring 78, is arranged to interact with the lever 76 at the same side as the lifting band clamp 41 relative the pivot connection 77. The head of the adjustment bolt 79 would then be accessed from the upper side of the lifting frame.

To avoid short-circuiting, the bracket 39" is made in a non-conducting material, such as a suitable plastic or composite material.

The lifting band clamp 41 is pivotably connected 80 to the lever 76 to obtain a pivot point P as discussed above.

When in use, each of the four lifting band clamps 41 of the lifting frame 17" is connected to a corresponding lifting band 16 of a container-handling vehicle 9,9'. The weight of the lifting frame 17" is sufficient to overcome the biasing force the spring 78 exerts on the lever 76, and the lifting band clamp 41 is pulled up to the upper level set by the adjustment bolt 79.

Rotation (i.e. actuation) of the adjustment bolt 79 will move the upper level of the lifting band clamp 41 relative the bracket 39". Thus, by rotation of the four adjustment bolts of the lifting frame, the lifting frame may be levelled. In the disclosed embodiment, the adjustment bolt is a threaded bolt. However, in alternative embodiments, the adjustment bolt may be any suitable adjusting element able to provide a surface, having an adjustable level, against which the band connector hub may abut.

During operation, one of the four lifting bands 16 may over time become slightly longer than the remaining lifting bands. This may be caused by for instance minor slippage in a connection to the lifting band, stretching of the lifting band etc.

Having the lifting band clamp 41 biased towards the lower level is then highly advantageous since the biasing ensures that the slightly longer lifting band is kept taut. Without the biasing, the slightly longer lifting band is slack. A slack lifting band increases the risk of error when the lifting band is spooled onto a lifting shaft and may in some instances cause short-circuiting due to contact between the lifting band 16 and the three-dimensional grid 4 of a storage system as disclosed above.

Further embodiments of adjustable lifting band connectors having a band connector hub biased towards a position wherein a lifting band clamp is at a lowest position are also envisioned. Such embodiments may for instance be obtained by modifying the lifting band connector disclosed in FIGS. 9a-9c by first replacing the adjustment bolt 42 by a smooth guiding pin such that the band connector hub 40 may slide freely in a vertical direction, secondly mounting an adjustment bolt able to abut against an upper surface of the extension 44 of the band connector hub, and thirdly arranging a resilient element to bias the band connector hub towards the position wherein the lifting band clamp 41 is at a lowest position. The resilient element may for instance be a spring arranged between an upper surface of the extension 44 and the bracket 39 to provide a force biasing the band connector hub in the downwards direction.

It is noted that in other embodiments, the lifting shaft assemblies 47,47' may comprise only one motor or more than two motors. This will depend on the required torque of the lifting shaft 22,22' as well as the torque and size of current BLDC motors. For example, if the motor 23a connected to the first end section 27a of the lifting shaft assembly 47 was able to provide sufficient torque alone, the other motor 23b could be replaced by an element simply connecting the second end section 27b and the intermediate shaft element 35. Various alternative solutions would be obvious to the skilled person based on the teachings of the present disclosure.

Various types of brushless DC motors are known, including permanent magnet synchronous motor (using permanent magnets) and switched reluctance motors (does not use any permanent magnets).

The working principles of the permanent magnet synchronous brushless DC motor is well known to the skilled person, e.g. as described in https://en.wikipedia.org/wiki/

Brushless_DC_electric_motor, and typically uses one or more permanent magnets in the rotor and electromagnets on the motor housing for the stator. A motor controller converts DC to AC. This design is mechanically simpler than that of brushed motors because it eliminates the complication of transferring power from outside the motor to the spinning rotor.

The lifting shaft assemblies (47,47') and the lifting frames (17,17') are disclosed in connection with a specific lifting band drive assembly (47,47',31) and a specific type of container-handling vehicle (9'), the vehicle having a cavity spaced to receive a single storage container. However, both the lifting shaft assemblies (47,47') and the lifting frames (17,17') may advantageously be used separately or in any combination in any type of lifting band drive assembly or container-handling vehicle. The exemplary lifting frames (17,17',17") may for instance be used in combination with any of the prior art lifting band drive assemblies.

The invention claimed is:

1. A container-handling vehicle for picking up storage containers from a three-dimensional grid of an underlying storage system, comprising a vehicle body and at least one lifting device for lifting a storage container from the grid, wherein
the lifting device comprises a lifting band drive assembly, a horizontal lifting frame and a plurality of lifting bands;
the lifting band drive assembly is connected to the vehicle body and comprises at least one rotatable lifting shaft;
the lifting frame comprises four corner sections, gripper elements for releasable connection to a storage container, and a lifting band connector arranged at each of the corner sections;
the lifting bands are connected to the lifting band drive assembly and the lifting band connectors, such that the lifting frame may move in a vertical direction relative to the lifting band drive assembly by rotation of the lifting shaft; and
wherein at least three of the lifting band connectors are adjustable, such that the vertical distance between the respective corner sections and the lifting band drive assembly may be adjusted;
wherein each of the lifting band connectors comprises a pivotable connection having a centreline perpendicular to the vertical plane of the connected lifting band.

2. A container-handling vehicle according to claim 1, wherein each adjustable lifting band connector comprises a bracket and a band connector hub, the bracket is connected to the lifting frame and the band connector hub is connected to the bracket and one of the lifting bands, such that movement of the band connector hub relative to the bracket will adjust the vertical distance between the respective corner section and the lifting band drive assembly.

3. A container-handling vehicle according to claim 2, wherein the vertical distance between the respective corner section and the lifting band drive assembly may be adjusted by rotation of the band connector hub about a horizontal axis or by movement of the band connector hub in a vertical or horizontal direction.

4. A container-handling vehicle according to claim 2, wherein the band connector hub comprises a lifting band clamp and is movable between a first position, wherein the lifting band clamp is at a lowest level relative the bracket, and a second position, wherein the lifting band clamp is at an upper level relative the bracket.

5. A container-handling vehicle according to claim 4, wherein the band connector hub abuts an adjustment element when in the second position, the adjustment element is preferably an adjustment bolt.

6. A container-handling vehicle according to claim 5, wherein the upper level of the lifting band clamp may be adjusted by actuation of the adjustment element.

7. A container-handling vehicle according to claim 4, wherein the band connector hub is biased towards the first position by a resilient element.

8. A container-handling vehicle according to claim 4, wherein the band connector hub comprises a lever connected to the lifting band clamp, the lever being pivotably connected to the bracket about a horizontal axis.

9. A container-handling vehicle according to claim 8, wherein the lever may pivot between the first position and the second position.

10. A container-handling vehicle according to claim 2, wherein the band connector hub is connected to the bracket via an adjustment element, such that actuation of the adjustment element will allow movement of the band connector hub relative to the bracket.

11. A container-handling vehicle according to claim 10, wherein the adjustment element is a threaded bolt that may be actuated by rotation.

12. A container-handling vehicle according to claim 1, wherein the lifting frame comprises at least one control module for controlling the gripper elements, and at least a part of each lifting band connector is made in an electrical insulating material, such that the lifting bands are only in electrical contact with the lifting frame at the at least one control module.

13. A container-handling vehicle according to claim 2, wherein the bracket, or an intermediate bracket element connecting the bracket and the lifting frame, is made in an electrical insulating material.

14. A method of adjusting the position of a lifting frame of a container-handling vehicle according to any of the preceding claims, comprising the steps of:
arranging the container-handling vehicle at an empty storage column at a periphery of the storage grid;
lowering the lifting frame, such that a service person has access to the lifting band connectors; and
adjusting at least one lifting band connector, such that the lifting frame is suspended in the horizontal plane by the lifting bands.

15. A method according to claim 14, wherein the at least one lifting band connector comprises a band connector hub and a bracket, and the step of adjusting the at least one lifting band connector comprises movement of the band connector hub relative to the bracket.

16. A method according to claim 14, wherein the step of adjusting the at least one lifting band connector adjusts the vertical distance between the respective corner sections and the lifting band drive assembly.

17. A method according to claim 14, wherein the step of lowering the lifting frame comprises lowering the lifting frame to a supporting structure on which the lifting frame is supported in a horizontal position, and the step of adjusting the at least one lifting band connector comprises tensioning any lifting bands that are slack.

18. An automated storage and retrieval system comprising a three-dimensional grid and at least one container-handling vehicle according to any of the claims 1-13, wherein the grid comprises multiple storage columns, in which storage containers may be stored on top of one another in vertical stacks; and the container handling vehicle is operated on rails at a top level of the grid for retrieving storage containers from, and storing storage containers in, the storage columns, and for transporting the storage containers horizontally across the grid.

* * * * *